(12) United States Patent
Uchiyama et al.

(10) Patent No.: US 7,676,079 B2
(45) Date of Patent: Mar. 9, 2010

(54) INDEX IDENTIFICATION METHOD AND APPARATUS

(75) Inventors: Shinji Uchiyama, Kanagawa (JP); Kiyohide Satoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1438 days.

(21) Appl. No.: 10/951,687

(22) Filed: Sep. 29, 2004

(65) Prior Publication Data

US 2005/0069196 A1    Mar. 31, 2005

(30) Foreign Application Priority Data

Sep. 30, 2003  (JP)  ............................. 2003-341621
Sep. 30, 2003  (JP)  ............................. 2003-341623

(51) Int. Cl.
  *H04N 9/077* (2006.01)
(52) U.S. Cl. ...................................... 382/154; 348/286
(58) Field of Classification Search ................. 382/154; 385/124, 116; 430/14, 282.1, 2, 290, 215, 430/220, 227, 523, 950, 1, 910, 912, 909; 349/65; 348/E9.008, 286; 359/1, 654, 3; 427/419.2; 355/1; 347/237; 345/427; 702/127, 702/153
See application file for complete search history.

(56) References Cited

U.S. PATENT DOCUMENTS

| | | | | |
|---|---|---|---|---|
| 5,727,093 | A | 3/1998 | Uchiyama et al. | ........... 382/294 |
| 5,969,725 | A | 10/1999 | Fujiki et al. | ................ 345/433 |
| 6,151,028 | A | 11/2000 | Kumagai et al. | ............. 345/427 |
| 6,400,362 | B1 | 6/2002 | Uchiyama et al. | ........... 345/420 |
| 6,697,761 | B2 | 2/2004 | Akatsuka et al. | ............ 702/151 |
| 6,724,930 | B1 | 4/2004 | Kosaka et al. | ............... 382/154 |
| 6,956,503 | B2 * | 10/2005 | Yokokohji et al. | .......... 340/988 |
| 2003/0144813 | A1 | 7/2003 | Takemoto et al. | ........... 702/153 |
| 2004/0133379 | A1 | 7/2004 | Kobayashi et al. | .......... 702/127 |
| 2005/0008256 | A1 | 1/2005 | Uchiyama et al. | ........... 382/291 |

FOREIGN PATENT DOCUMENTS

| | | |
|---|---|---|
| JP | 11-84307 | 3/1999 |
| JP | 2000-41173 | 2/2000 |
| JP | 2000-227309 | 8/2000 |
| JP | 2000-347128 | 12/2000 |

(Continued)

OTHER PUBLICATIONS

Andrei State, et al.; "Superior Augmented Reality Registration by Integrating Landmark Tracking and Magnetic Tracking", Proc. SIGGRAPH '96, pp. 429-438 (Jul. 1996).

(Continued)

*Primary Examiner*—Sheela C Chawan
(74) *Attorney, Agent, or Firm*—Fitzpatrick, Cella, Harper & Scinto

(57) ABSTRACT

An index arranged on a real space is detected from an image sensed by a camera, and the position of the index in the image is calculated (S405). The index is projected onto the image sensing plane of the camera on the basis of the position and orientation information of the camera, the position information of the index, and the like (S403). A corresponding index is identified based on the distance between the detected and projected indices on the image plane, and geometric information of the index (e.g., directionality) (S408). With this method, an index can be accurately identified by a simple method.

18 Claims, 21 Drawing Sheets

FOREIGN PATENT DOCUMENTS

JP          2002-090118          3/2002

OTHER PUBLICATIONS

Hirokazu Kato, et al., "Augmented Reality System and Its Calibration Based on Marker Tracking", Journal of Virtual Reality Society of Japan, vol. 4, No. 4, pp. 607-616 (Dec. 1999).

Xiang Zhang, et al., "Visual Marker Detection and Decoding in AR Systems: A Comparative Study", Proc. of International Symposium on Mixed and Augmented Reality (ISMAR'02) (2002).

H. Kato et al., "An Augmented Reality System and its Calibration based on Marker Tracking," Transactions of the Virtual Reality Society of Japan, vol. 4, No. 4, pp. 607-616, Dec. 1999.

X. Zhang et al., "Visual Marker Detection and Decoding in AR Systems: A Comparative Study," Proc. of International Symposium on Mixed and Augmented Reality (ISMAR'02), 2002.

A. State et al., "Superior Augmented Reality Registration by Integrating Landmark Tracking and Magnetic Tracking," Proc. SIGGRAPH '96, pp. 429-438, Jul. 1996.

Japanese Office Action in corresponding Japanese Application No. 2003-341623, dated Jul. 18, 2008.

Nakai et al.: "Cypher: Cyber Photographer in Wonder Space" Proceedings of the First Conference on Computational Semiotics for Game and New Media, Sep. 10-12, 2001, XP008066838, The Netherlands.

Japanese Office Action dated Jul. 22, 2008 in corresponding Japanese Application No. 2003-341621, and a partial English-language translation thereof.

* cited by examiner

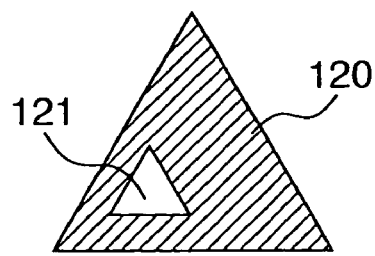
F I G. 9A
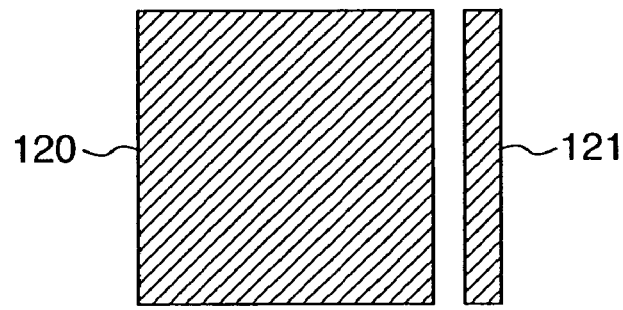
F I G. 9B
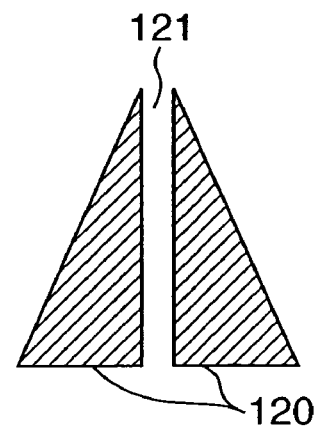
F I G. 9C
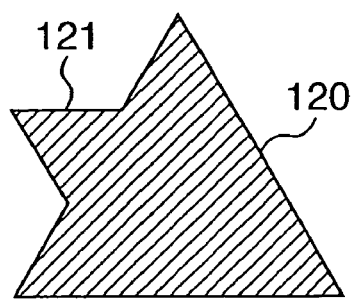
F I G. 9D
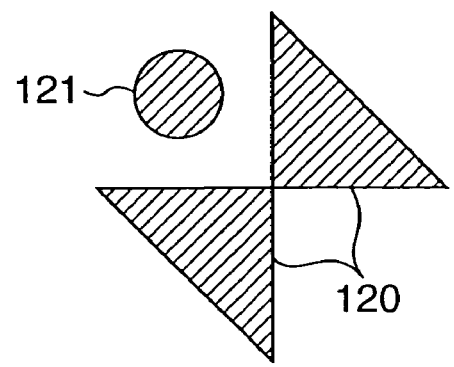
F I G. 9E

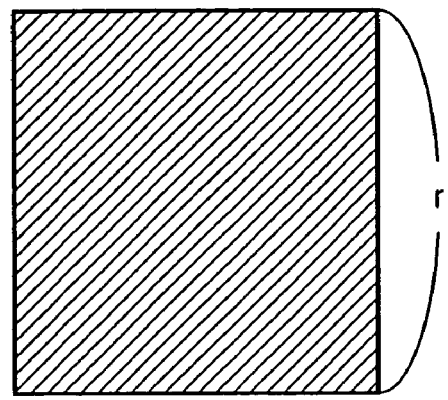
F I G. 19A
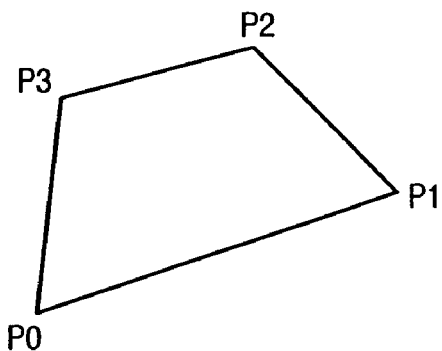
F I G. 19B
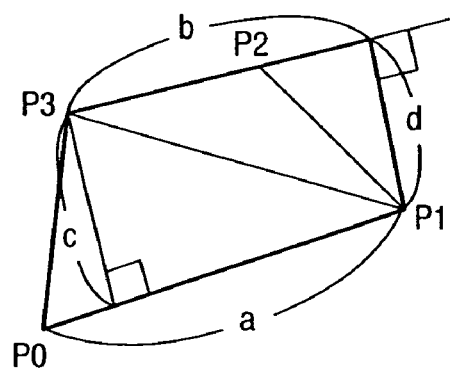
F I G. 19C

F I G. 20
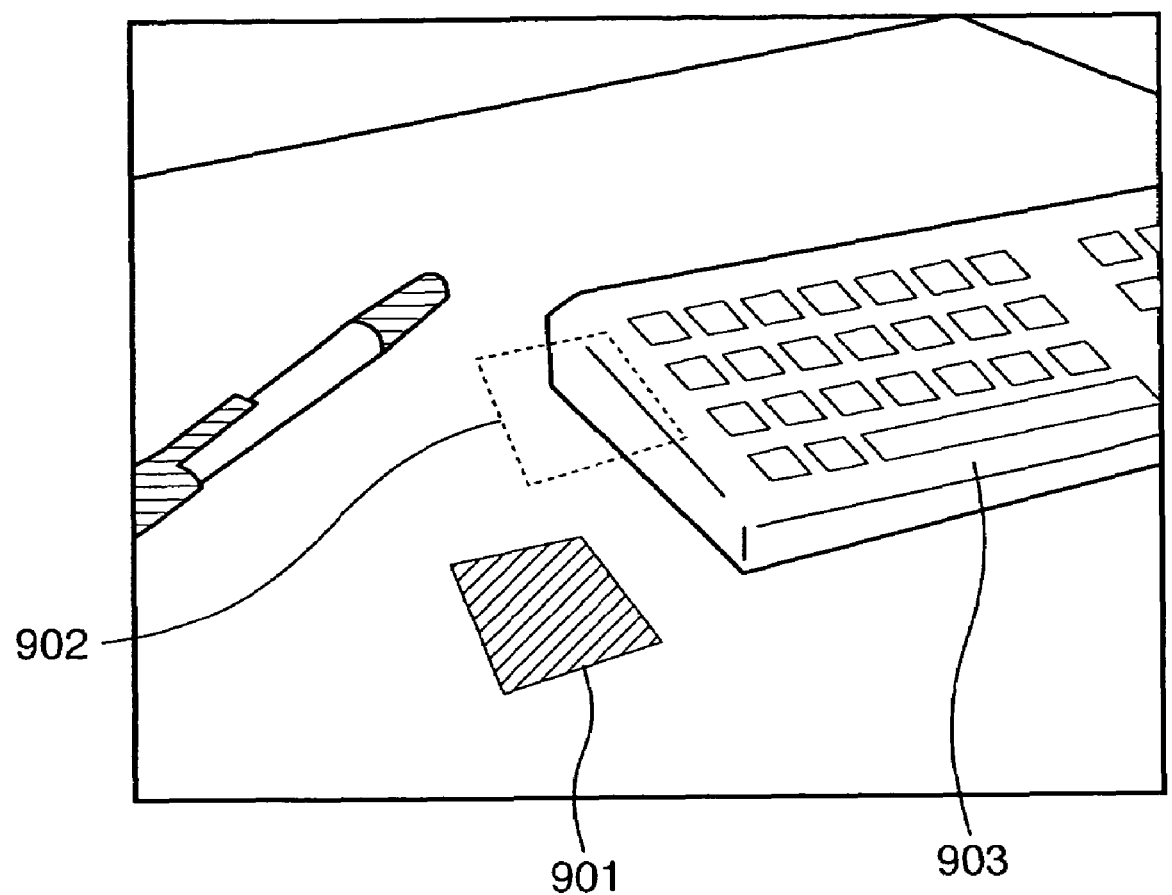

INDEX IDENTIFICATION METHOD AND APPARATUS

FIELD OF THE INVENTION

The present invention relates to an index identification technique for detecting and identifying indices set on a real space or real object from an image sensed by an image sensing device and, more particularly, to an index identification technique using geometric information of an index.

BACKGROUND OF THE INVENTION

[Prior Art 1]

The position and orientation of an image sensing unit (to be referred to a camera as needed hereinafter) such as a camera for capturing a real space are required to be measured in a mixed reality system that merges and displays a real space and virtual space. As such prior arts, a method of correcting measurement errors of a position and orientation sensor which measures the position and orientation of a camera using a marker which is arranged on a real space and has a known position or a feature point whose position on the real space is known (the marker and feature point will be generally referred to as an index hereinafter) is available, as disclosed in Japanese Patent Laid-Open No. 11-084307, Japanese Patent Laid-Open No. 2000-041173, and A. State, G. Hirota, D. T. Chen, B. Garrette, and M. Livingston: Superior augmented reality registration by integrating landmark tracking and magnetic tracking, Proc. SIGGRAPH '96, pp. 429-438, July 1996. (reference 1).

In other words, the method of these prior arts estimates the position and orientation of a camera using the position and orientation sensor for measuring the position and orientation of the camera, and an index sensed by the camera. As an index used in such method, the center of gravity of a color region, concentric circle, and the like are known. A plurality of indices are normally used at the same time. As one of means for determining which of a plurality of indices arranged on the real space an index detected from an image sensed by the camera corresponds to, the relationship between the coordinate position of the index detected from the image, and that of the index on an image plane obtained by projecting the absolute value position of the index on the basis of the measurement value of the position and orientation sensor may be exploited.

[Prior Art 2]

On the other hand, a method of estimating the position and orientation of a camera using only an index sensed by the camera without using any position and orientation sensor is known, as disclosed in Kato, Billinghurst, Asano, and Tachibana: Augmented reality system and its calibration based on marker tracking, Journal of Virtual Reality Society of Japan, vol. 4, no. 4, pp. 607-616, Dec. 1999. (reference 2), X. Zhang, S. Fronz, and N. Navab: Visual marker detection and decoding in AR systems: A comparative study, Proc. of International Symposium on Mixed and Augmented Reality (ISMAR'02), 2002. (reference 3). In these non-patent references, a square index is used, and the position and orientation of the camera are estimated on the basis of the coordinate positions of four vertices of the square. Since a square has a rotational symmetry shape in increments of 90° to have, as an axis of rotation, an axis which passes through its central point (intersection of diagonal lines), and is perpendicular to its plane, up, down, right, or left cannot be determined based on the coordinate positions of the vertices alone. For this reason, another image feature is formed inside the square index to determine up, down, right, or left. Furthermore, when a plurality of indices are to be used, since which of the plurality of indices is currently captured must be identified based only on the image sensed by the camera, graphic information such as unique patterns, codes, or the like, which are different for respective indices, is embedded in each index.

In the method of estimating the position and orientation of the camera of prior art 1, when a point or concentric marker is used as an index, information that one index has is only one coordinate value. For this reason, a geometric information volume is small, and a method of simultaneously using a relatively large number of indices is adopted to attain accurate estimation of the position and orientation and to broaden the observation view.

As described above, when a plurality of indices are used at the same time, a method of identifying which of indices arranged on the real space an index captured by an image corresponds to must be devised. Especially, when image features (colors, shapes, or the like, which can be identified by an image process) of indices are identical or have a small difference, and a large number of indices are arranged, there is a possibility of identification errors.

The possibility of identification errors will be described in detail below using FIG. 5. Referring to FIG. 5, reference numeral 500 denotes an image sensing range (image region) of a camera; and 501 and 502, point markers which are arranged on the real space and are detected from a sensed image. Reference numerals 503 and 504 denote points which are obtained by projecting the absolute positions of two point markers sensed by the camera onto the image sensing plane of the camera using measurement values of a position and orientation sensor attached to the camera.

If the position and orientation sensor has no error, the points 501 and 503 and points 502 and 504 must respectively match on the image plane. However, in practice, due to the influence of errors of the position and orientation sensor, the coordinate positions of the points 503 and 504 on the image plane are calculated as those which deviate from the points 501 and 502. In case of this example, the coordinate position of the point 504 is projected at a position which falls outside the image region. An index is identified by comparing the positions of indices projected onto the image plane with those of indices detected from the sensed image, and determining a pair of indices having a small distance as an identical index. In this case, since the point 503 is closer to the point 502 than the point 501, it is determined that points 503 and 502 correspond to each other, and it is identified that the index "502" detected from the image is an index "503" arranged on the real space. As in this example, when a plurality of indices whose image features are identical or have a small difference are used like in prior art 1, identification errors may occur.

In the method of estimating the position and orientation of the camera of prior art 1, a small circular sheet-like object of a specific color can be used as an index. In this case, information that the index has includes a three-dimensional (3D) position (coordinates) and color. Using measurement values of the position and orientation sensor, the 3D position of the index is projected onto the image plane of the camera, while a color region detection process for detecting the color of that index from the image is executed to calculate a barycentric position in the image. The 3D position projected onto the image plane is compared with the barycentric position calculated from the image, and a pair of, e.g., closest indices are determined as an identical index, thus identifying the index in the image.

In this manner, when an index is detected from the image by color region detection, the real space to be sensed by the camera must not include the same color as that of an index other than that index.

For example, a case will be exemplified below wherein various objects are present on a space as a background, as shown in FIG. 13. Referring to FIG. 13, an index 1203 to be used is set on a real object, and has, e.g., a red circular region. A real space to be sensed by a camera 101 includes a ballpoint pen 1204 with a red cap together with the index. Assume that an image sensed by the camera 101 in this state is that shown in FIG. 14. FIG. 14 also illustrates a point 1302 obtained by projecting the 3D coordinate position of the index 1203 onto the image sensing plane of the camera 101 on the basis of the measurement values of a position and orientation sensor 102.

At this time, when an index 1301 is detected from the image using color region detection, as described above, not only the circular region of the index 1203 but also a red region 1303 of the ballpoint pen 1204 are more likely to be detected as a red region. If the region 1303 is detected as a red region, since the barycentric position of the red region 1303 of the ballpoint pen 1204 is closer to the projected position 1302 than that of the index 1301, the region 1303 is identified as an index corresponding to the projected position 1302. In this manner, if the space to be sensed includes an object having the same or similar color as or to that of an index, that object is erroneously recognized as an index.

In order to prevent such problem, a method of using an index as a combination of different colors which are arranged in a concentric pattern, checking a combination of colors after color region detection, and detecting only a region with a correct combination as an index is available. In this case, since a part of a background is unlikely to be detected as an index compared to a case wherein a monochrome index is used, no identification errors occur in case of FIG. 13.

However, in order to perform stable index detection using color region detection, index colors are often set to be striking colors. Furthermore, when different colors are to be combined in a concentric pattern, an index must be sensed with a sufficiently large size in the image so as to stably detect the concentric pattern. That is, a large, unattractive index must be placed on the real space. However, it is often not allowed to set such index on the real space, or such index nullifies the appearance of the real space.

On the other hand, the method of utilizing an index with a geometrical spread like a square index used in prior art 2 is available. However, with prior art 2, since each individual marker must be identified from only the image, code information unique to each marker, symbol information that can serve as a template, or the like must embedded so as to identify up, down, right, or left. FIGS. 7A to 7C show examples of practical square indices, which are used in prior art 2 disclosed in references 2 and 3.

Since an index with such complicated structure must be detected from the image, it cannot be recognized unless the index is captured to occupy a sufficiently large area in the sensed image. In other words, this means that a broad region on the real space must be assured to set an index, or the camera must sufficiently approach the index. Or a strict layout condition of indices is required.

SUMMARY OF THE INVENTION

It is a principal object of the present invention to solve the problems of these prior arts.

According to an aspect of the present invention, there is provided an index identification method for detecting and identifying an index from an acquired image using position information and geometric information of the index, which are held in advance, comprising: an image acquisition step of acquiring an image obtained by sensing a real space including an index having a predetermined shape by an image sensing device; a position and orientation information acquisition step of acquiring measurement results of a three dimensional position and orientation of at least one of the image sensing device and the real object; and an index identification step of detecting and identifying the index from the acquired image on the basis of the three dimensional position and orientation measurement results, and the position information and the geometric information of the index.

According to another aspect of the present invention, there is provided an index which is arranged on a real space and is used as an absolute position reference on a predetermined coordinate system, characterized by having an outer appearance formed by a combination of a basic shape having no directionality, and one directionality giving shape that gives directionality to the basic shape.

According to a further aspect of the present invention, there is provided a index identification apparatus for detecting and identifying an index from an acquired image using position information and geometric information of the index, which are held in advance, comprising: image acquisition unit adapted to acquire an image obtained by sensing a real space including an index having a predetermined shape by an image sensing device; position and orientation information acquisition unit adapted to acquire measurement results of a three dimensional position and orientation of at least one of the image sensing device and the real object; and index identification unit adapted to detect and identify the index from the acquired image on the basis of the three dimensional position and orientation measurement results, and the position information and the geometric information of the index.

According to a further aspect of the present invention, there is provided a computer program for making a computer execute an index identification method of the present invention or a computer readable recording medium storing that computer program.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A to 9E show other examples of indices that can be used in the first to third embodiments of the present invention;

FIGS. 19A to 19C are views for explaining a square index used in a modification of the fourth to sixth embodiments of the present invention, and a method of calculating the area of that index;

FIG. 20 depicts a state wherein an index is captured by an image, so as to give a supplementary explanation of the process in a modification of the fourth to sixth embodiments of the present invention.

DETAILED DESCRIPTION OF THE PREFERRED EMBODIMENTS

Preferred embodiments of the present invention will now be described in detail in accordance with the accompanying drawings.

First Embodiment

Figure 1:
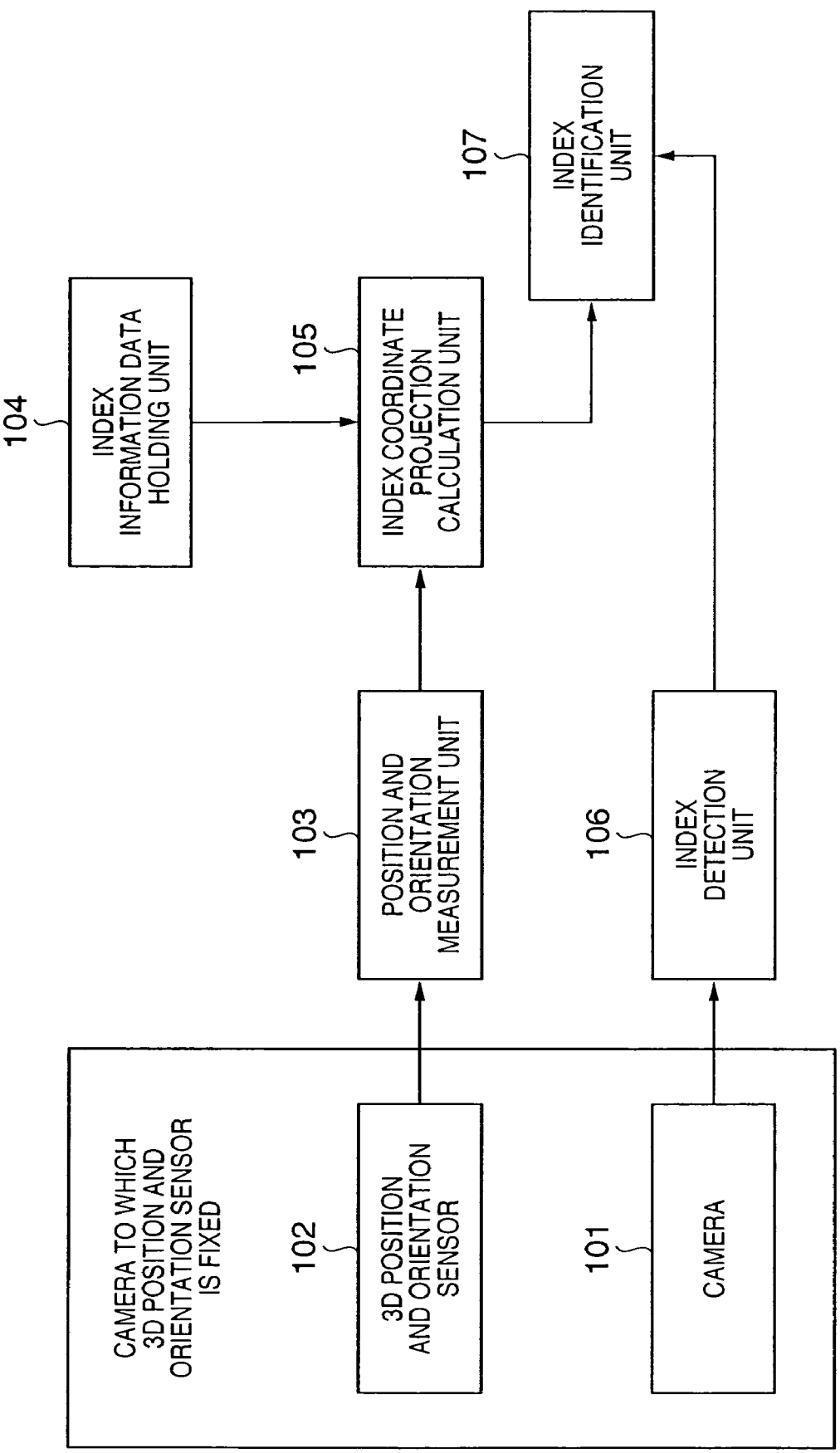
FIG. 1 is a block diagram showing the functional arrangement of an index identification apparatus according to the first embodiment of the present invention.
Figure 8:
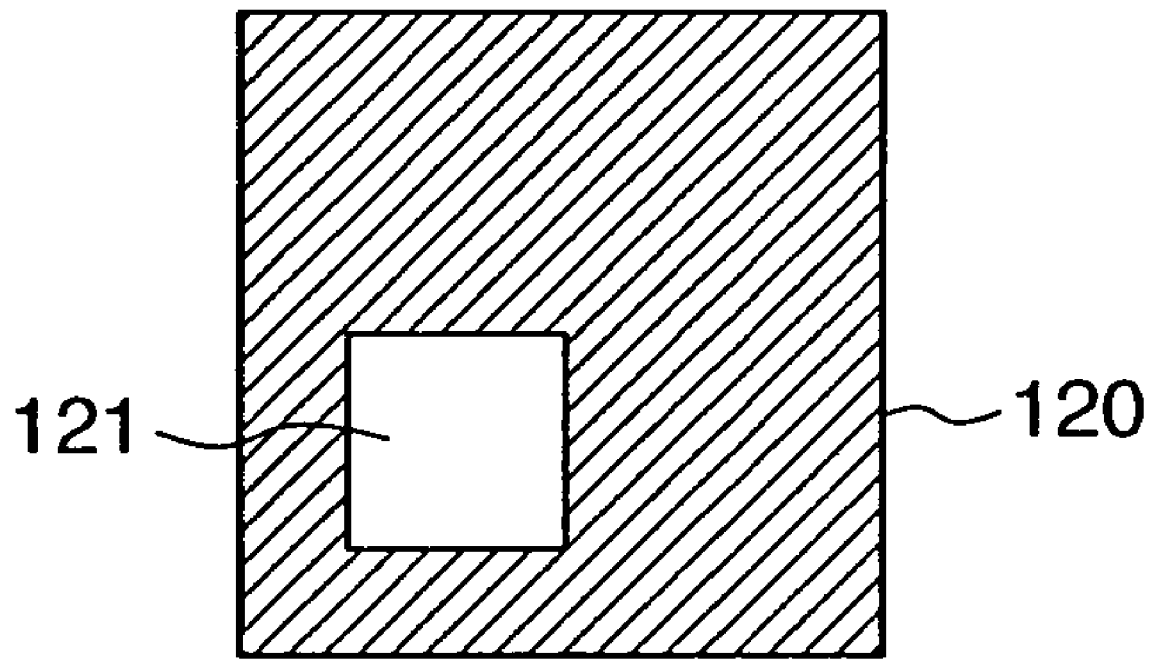
FIG. 8 shows an example of a directional index used in the first to third embodiments of the present invention.

FIG. 1 is a block diagram showing an example of the arrangement of an index identification apparatus according to this embodiment. This embodiment is characterized by using a directional index. In this case, as an example of a preferred index, an index in which a square (directionality giving shape) 121 having a largely different lightness value is arranged at a position offset to one vertex in a square shape (basic shape) 120, as shown in FIG. 8, is used. That is, in this embodiment, an index is formed by a basic shape and directionality giving shape, and their positional relationship is registered together with the layout position of the index, thus allowing identification of the direction of the index. In this way, this embodiment uses directionality information of an index as geometric information of an index.

Figure 11A:
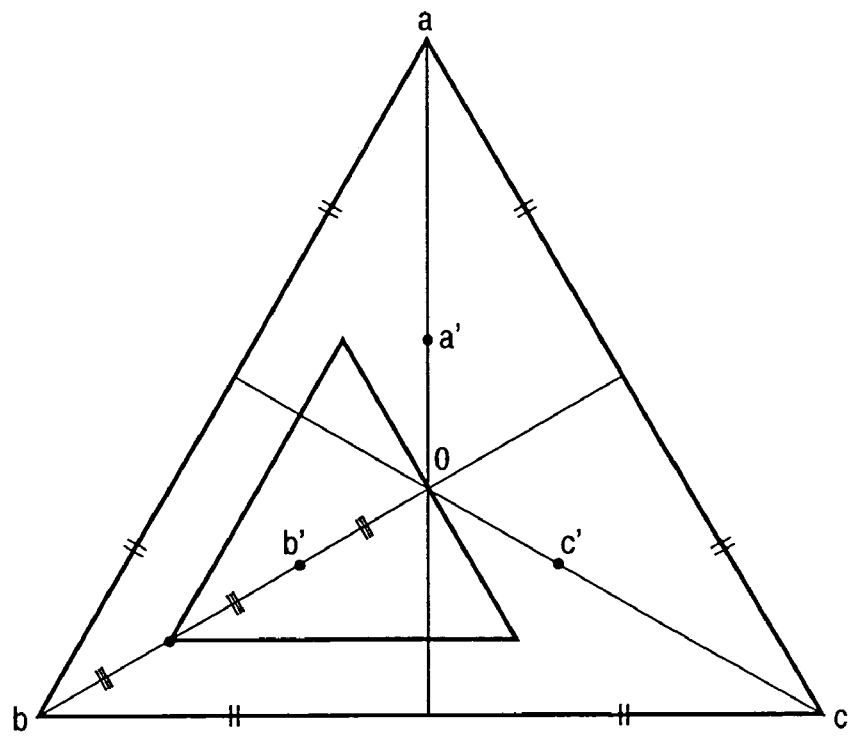
Figure 11B:
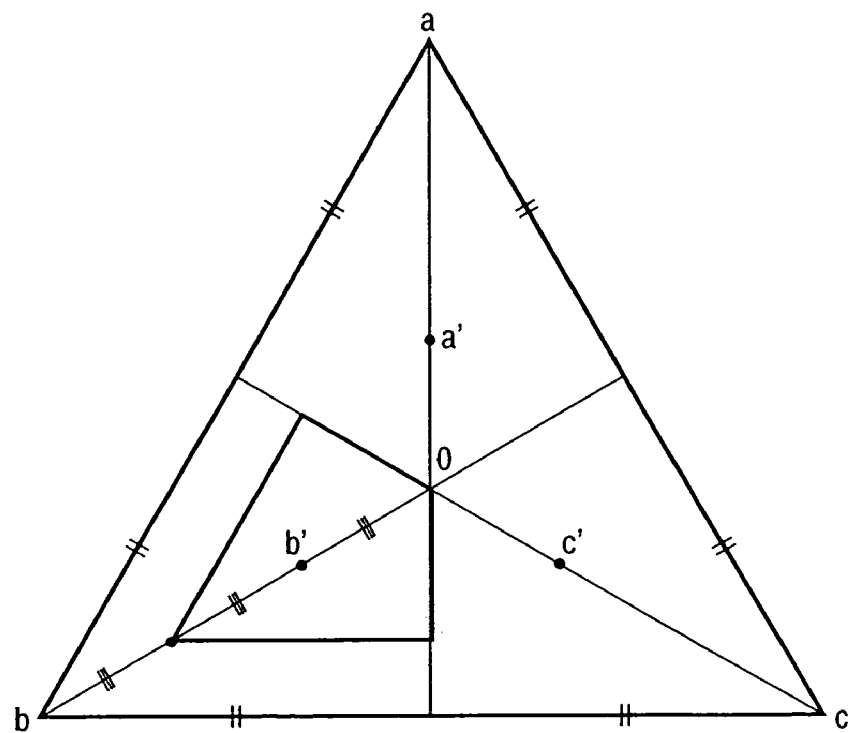

In the index of this embodiment, the directionality giving shape 121 is arranged to have the central point of the basic shape 120 as one vertex, and to have a diagonal vertex at a position ⅔ of the distance to the vertex. With this arrangement, even when the size of the entire index is reduced, the spacing between the periphery of the basic shape 120 and that of the directionality giving shape 121 is maintained, and the center of the directionality giving shape 121 can be detected as much as possible upon acquiring the lightness value of the inner square as the directionality giving shape 121. Likewise, FIGS. 11A and 11B show examples of indices when an outer shape is a regular triangular shape.

Figure 7A:
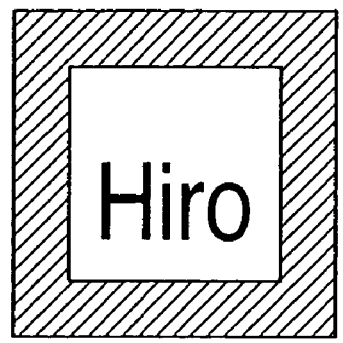
FIGS. 7A to 7C show examples of indices used in the prior art.
Figure 7B:
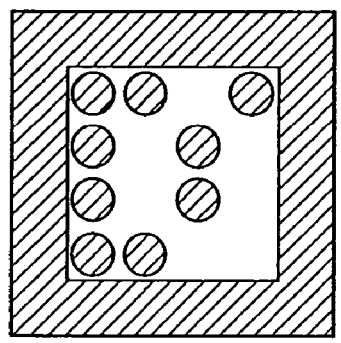
Figure 7C:
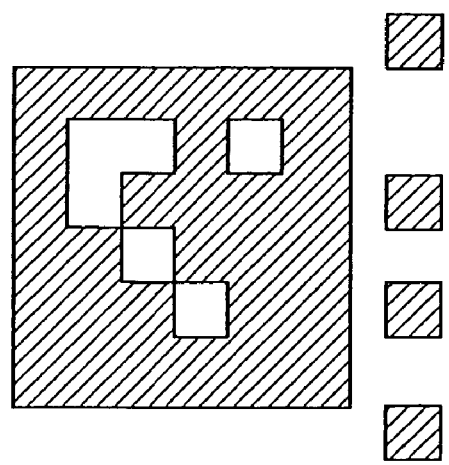

As a feature of this index, unlike the indices used in prior art 2 shown in FIGS. 7A to 7C, since an information volume embedded inside an outer square is small, the index can be stably detected from an image even when it is sensed in a relatively small size. Instead, only information indicating directionality is embedded inside this index, but no information used to identify each individual index is embedded. If an index is detected from the image, each individual index cannot be distinctively identified. In the following description, this index will be referred to as a directional square index.

Reference numeral 101 denotes a camera which can sense a real space, and comprises, e.g., a video camera having a CCD or CMOS sensor as an image sensing element. A 3D position and orientation sensor 102 using, e.g., a magnetic sensor or the like is fixed to the camera 101. A position and orientation measurement unit 103 drives and controls the 3D position and orientation sensor 102 to measure the position and orientation of the camera 101.

Figure 10:
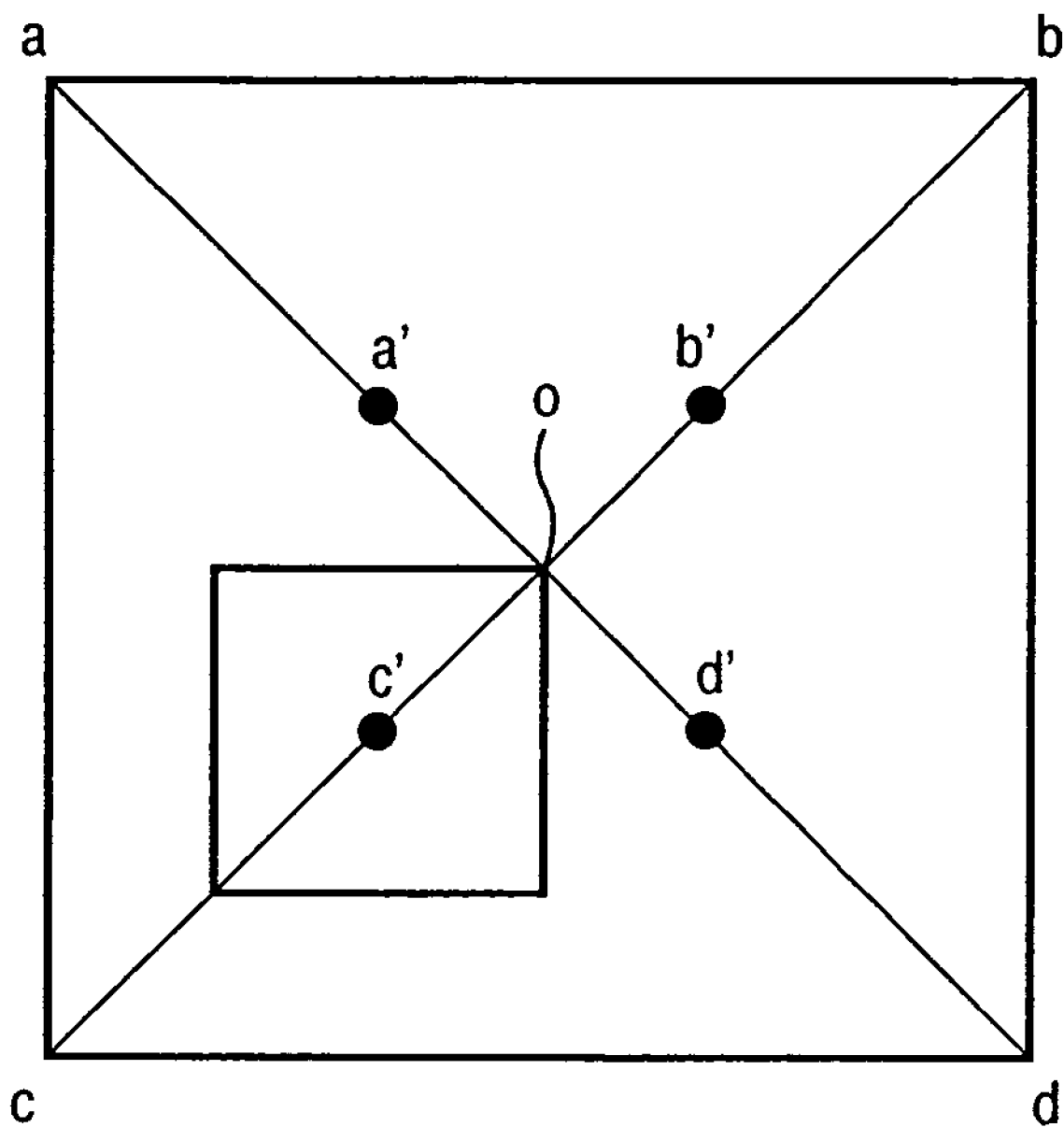
FIG. 10 and FIGS. 11A and 11B are views for explaining a directionality detection method of an index.

An index information data holding unit 104 pre-stores information required to identify an index and its direction such as a layout position (e.g., a 3D absolute coordinate position of a central point), 3D absolute coordinate positions of vertices, information required to specify the size, orientation, and direction of an index (e.g., information indicating the positional relationship between the directionality giving shape and basic shape; the coordinate position of a vertices closest to the directionality giving shape in, e.g., an index shown in FIG. 10), information associated with the directionality giving shape (information associated with a shape and color or the like), and so forth, for each of directional indices arranged on the real space, i.e., each of directional square indices in this embodiment. Note that registration items listed here are merely examples, and information more or fewer than these items may be registered depending on each individual index to be used and an index identification method.

The position and orientation measurement unit 103 supplies position and orientation values of the camera 101 obtained from the 3D position and orientation sensor 102 to an index projection calculation unit 105. The index projection calculation unit 105 calculates the projected position of an index, which seems to be sensed by the camera 101, on the image plane of the camera 101, on the basis of the position and orientation values of the camera 101, and 3D coordinate information of the directional square index recorded in the index information data holding unit 104. An index projected onto the image plane (to be also referred to as an image sensing plane) will be referred to as a projected index hereinafter.

An index detection unit 106 captures the sensed image of the camera 101 and detects a region which seems to be an index (to be also referred to a detected index hereinafter) from the image on the basis of information associated with a predetermined index such as a color, shape, and the like. An index identification unit 107 identifies an index from the projected position calculated by the index projection calculation unit 105 and the index position in the image detected by the index detection unit 106. Details of an index identification method will be described later.

Figure 2:
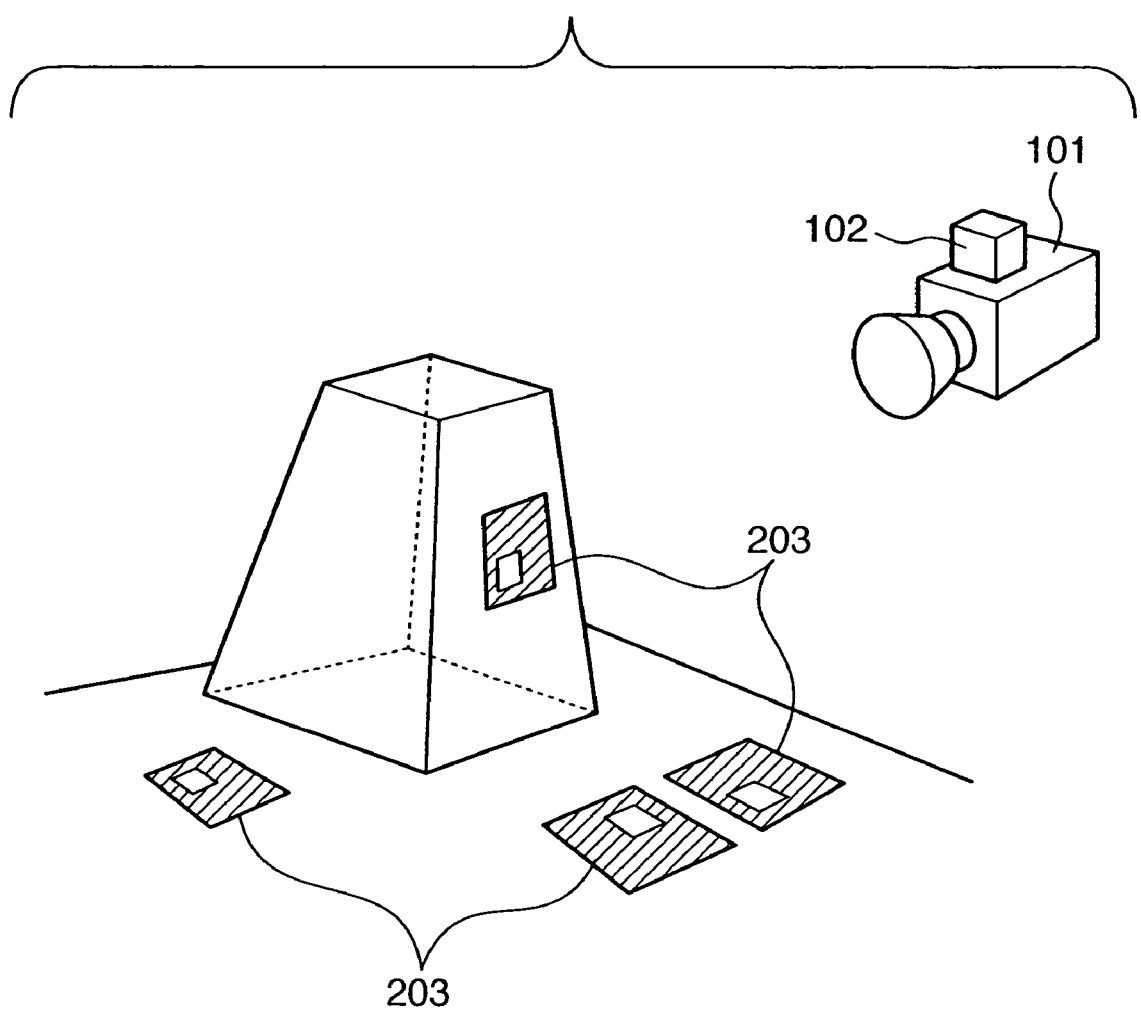
FIG. 2 depicts a use scene according to the first embodiment of the present invention.

FIG. 2 depicts a desirable use state of the arrangement shown in FIG. 1. Directional square indices 203 are arranged on the real space, as shown in FIG. 2, and the index information data holding unit 104 records information associated with the sizes, layout positions, and the like of these indices.

The process to be executed by the index identification apparatus with the above arrangement will be described below with reference to the flowchart shown in FIG. 4.

In step S401, the 3D position and orientation sensor 102 measures the position and orientation, and sends them to the position and orientation measurement unit 103. In step S402, viewing transformation is calculated based on the result obtained in step S401 in the form of a transformation matrix. The viewing transformation is coordinate transformation between two coordinate systems, i.e., a camera coordinate system as a 3D coordinate system which has the viewpoint position of the camera as an origin, the image sensing plane as an x-y plane, and a viewing axis as a vector in a direction of a -z-axis, and a world coordinate system as a coordinate system fixed to the real world, i.e., transformation that transforms a point on the world coordinate system onto that on the camera coordinate system. That is, by calculating this viewing transformation, a coordinate value on the world coordinate system can be easily converted into that on the camera coordinate system via calculations.

In step S403, the positions (coordinate positions) of the central point and vertices of each individual directional square index recorded in the index information data holding unit 104 are transformed into those on the camera coordinate system using the viewing transformation calculated in step S402, and their estimated positions (projected coordinate positions) on the image sensing plane are calculated by making a perspective projection transformation calculation of the camera 101. Since individual vertices are independently and distinctively recorded, it is obvious in terms of the processing sequence that which of individual vertices is projected onto the image sensing plane to obtain each of the projected coordinate positions. Also, which of vertices indicates the direction of each directional square index (i.e., to which of vertices the square 121 arranged at an offset position in an index is offset) is also obvious. Note that the perspective projection transformation of the camera 101 is uniquely determined by the lens focal length and principal point (projection center) position of the camera 101, and can be calculated in advance before practicing this embodiment.

During the processes in steps S401, S402, and S403, the camera 101 senses a real space in step S404, and an outer square is detected as one process for detecting each directional square index from the obtained sensed image to calculate its vertices and central point in step S405. In this case, an arbitrary method can be used. For example, the following method may be used.

The lightness value of an index is set to be different from that of the background, and binarization is made based on the lightness value. After that, a continuous region is obtained by a labeling process. By approximating the periphery of the label of that continuous region by a polygonal line, an outer quadrangle (basic shape) 120 is detected. The vertices of the obtained quadrangle are calculated, and the central point is obtained by calculating the intersection of diagonal lines.

Next, as one process for detecting each directional square index, the direction of the directional square index is detected using information inside the detected outer quadrangle in step S406. Upon detecting the direction, for example, as shown in FIG. 10, a point (a', b', c', d') which divides each of line segments that connect the four vertices (a, b, c, d) of the outer quadrangle and central point O to 1:2 from the central point to the corresponding vertex is calculated. Furthermore, the lightness values of pixels of these four points in the image are compared to obtain a point with a largest lightness difference. Since a point (c' in FIG. 10) which has a largest lightness difference from the remaining three points of the four points is derived from the square 121 which is arranged at an offset position in the index shown in FIG. 8, the direction of the directional square index detected from the image can be determined based on this point. For example, when the coordinate position of a vertex closest to the directionality giving shape is used as information for specifying a direction, the coordinate position of a vertex closest to the point with the largest lightness difference is specified.

With the aforementioned steps, the projected coordinate positions obtained by projecting the vertices and central point of each directional square index onto the image plane, the directionality of that index, the detected coordinate positions of the vertices and central points of each square index (which appears not as a square but as a quadrangle in the image) detected from the image, and the directionality of that index can be obtained on the basis of the measurement values of the 3D position and orientation sensor 102.

Figure 3:
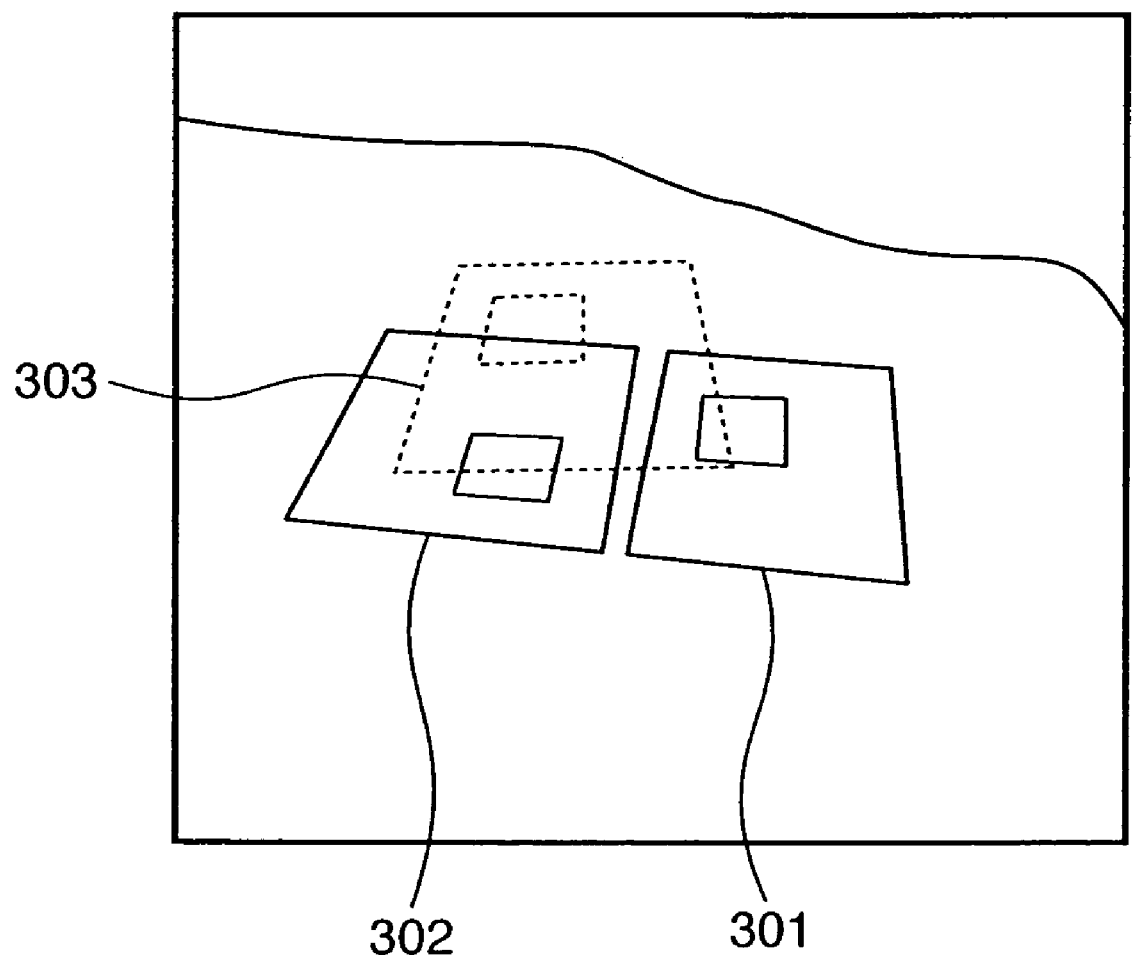
FIG. 3 depicts a state wherein directional square indices are captured in an image, and one of these indices is projected onto the image.

The final process of this embodiment is identifying each individual index when a plurality of directional square indices, each of which cannot be identified by merely detecting it from an image, are arranged on the real space. For example, when two indices are arranged side by side, as shown in FIG. 3, they must be finally identified. In FIG. 3, reference numerals 301 and 302 denote square indices obtained by detecting directional square indices arranged on the real space from the sensed images. As shown in FIG. 3, these two indices are arranged side by side to have different directionalities.

At this time, assume that one of the projected coordinate positions of the indices, which are obtained in step S403 and may be included in the field of view of the camera 101, onto the image plane of the camera 101 is calculated as a position of an index 303. Also, assume that this index 303 is the index 301 detected in the image. In such case, if the position of an index projected onto the image plane is compared with that of an index detected from the sensed image, and indices having a smaller distance are identified as an identical index, indices 303 and 302 are erroneously identified as corresponding ones, as has been explained in the background of the invention. Processes that can solve this problem and can correctly identify an index are steps S407 and S408 to be described below.

In step S407, a candidate list of detected indices in the image, which may correspond to respective projected indices obtained in step S403, is generated on the basis of the distances between the central points projected onto the image plane obtained in step S403, and the central points of indices detected in the sensed image in step S405. This list is a linear list in the order of smaller central point distances. In step S408, the candidate list which may correspond to the projected indices obtained in step S403 is searched in turn from the head for an index with the same directionality. For example, when the coordinate position of a vertex closest to the directionality giving shape is used as information for specifying the direction, the relationship between the coordinate position of the vertex specified in step S406 and the central point coordinate position calculated in step S405, and the relationship between the coordinate position of the vertex closest to the directionality giving shape held in advance for each index in the candidate list, and that of the central point, are evaluated to find out an index with the same directionality.

The processes in steps S407 and S408 are explained taking FIG. 3 as an example. In step S407, detected indices 302 and 301 which have smaller distances to the projected index 303 are listed as corresponding candidates. Since the detected candidate 302 is closer to the projected index 303 than the index 301, the detected index 302 ranks ahead of the index 301 in the list. Using this list, it is checked in step S408 if the projected index 303 and detected index 302 have the same directionality, and then if the projected index 303 and detected index 301 have the same directionality.

Since the detected index 302 and projected index 303 have a large directionality difference, they are not associated with each other, and the detected index 301 and projected index 303, which may have the same directionality, are associated with each other.

In this embodiment, the two processes in steps S407 and S408 are a method of listing up detected indices as corresponding candidates with reference to projected indices, and associating indices. However, a method of listing projected indices as corresponding candidates with reference to detected indices may be used. The present invention is not limited to a method of simply generating a candidate list based on distances of indices, but it may adopt various other methods as long as a candidate list is generated by a method based on the coordinate positions of indices on the image plane. Furthermore, in place of the processing sequence that generates a candidate list based on the distances on the image plane, and then associates indices based on the directionality of each index in that list, indices with the same directionality may be listed up, and indices may be associated with each other based on the distance on the image plane from that list.

As described above, according to this embodiment, since an index is identified using its directionality, even when a plurality of identical indices are arranged, each individual index can be identified. Therefore, a simpler index can be used, and detection of the index itself is consequently facilitated. Compared to the prior art that provides unique patterns for respective indices, restrictions on the size and layout of an index, and the positions of the camera and index can be relaxed.

More specifically, the directional square index used in this embodiment is a combination of two simple squares (a square includes another square at an offset position), and does not require any figures, patterns, and the like as additional information for identification such as unique patterns for respective indices or the like. Hence, the directional square index can be stably detected from the image by a simple process. As a result, not only when an index is captured in an image to have a sufficiently large size but also when an index in the sensed image has a small size, the index can be stably detected.

The index to be used can have a smaller size than those used in prior art 2 shown in FIGS. 7A to 7C, and can also have a relatively inconspicuous outer appearance.

Second Embodiment

In the first embodiment, the 3D position and orientation sensor is fixed to the camera, and the camera which dynamically moves senses indices fixed to the real space. However, the present invention can be preferably applied to a case wherein the camera is fixed in position, and a real object on which the 3D position and orientation sensor and indices are laid out moves.

Figure 6:
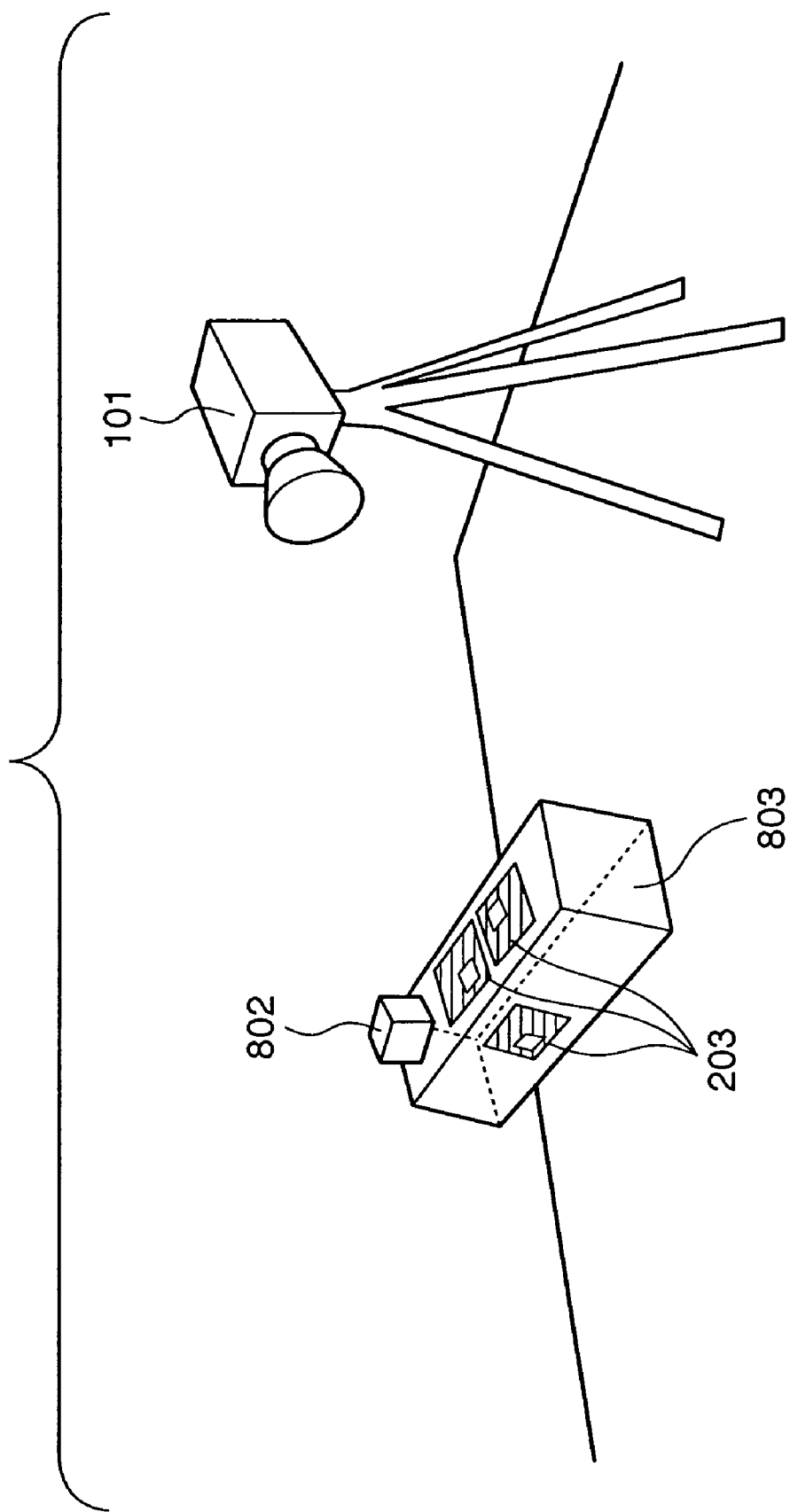
FIG. 6 depicts a use scene according to the second embodiment of the present invention.

FIG. 6 depicts the relationship among a camera 101, real object 803, and 3D position and orientation sensor 802. Note that the index identification apparatus shown in FIG. 1 can be used without modifying its arrangement, except that the attached position of the 3D position and orientation sensor 802 is changed from the camera 101 to the real object 803.

Figure 4:
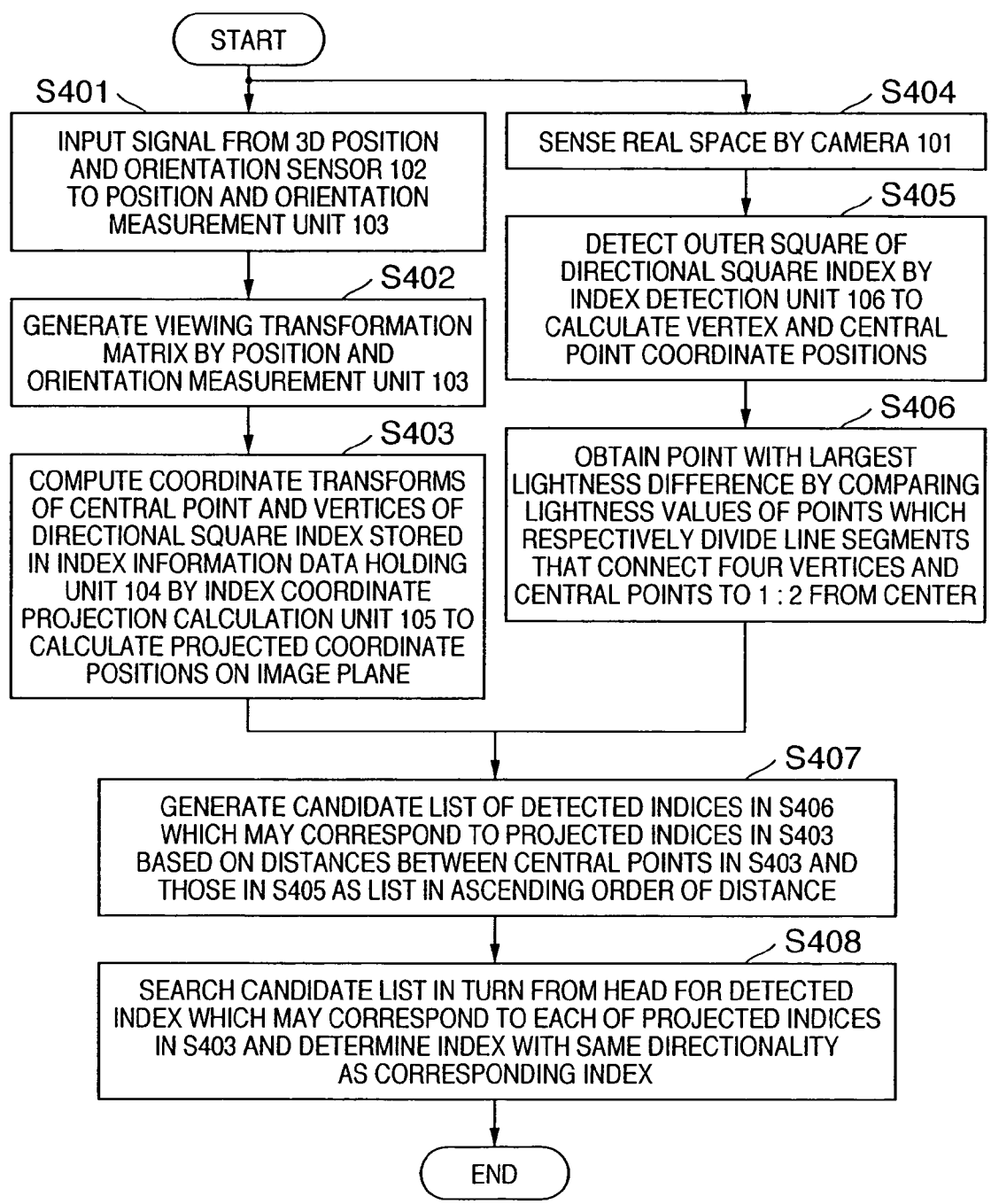
FIG. 4 is a flowchart of the process to be executed by the index identification apparatus according to the first embodiment of the present invention.
Figure 5:
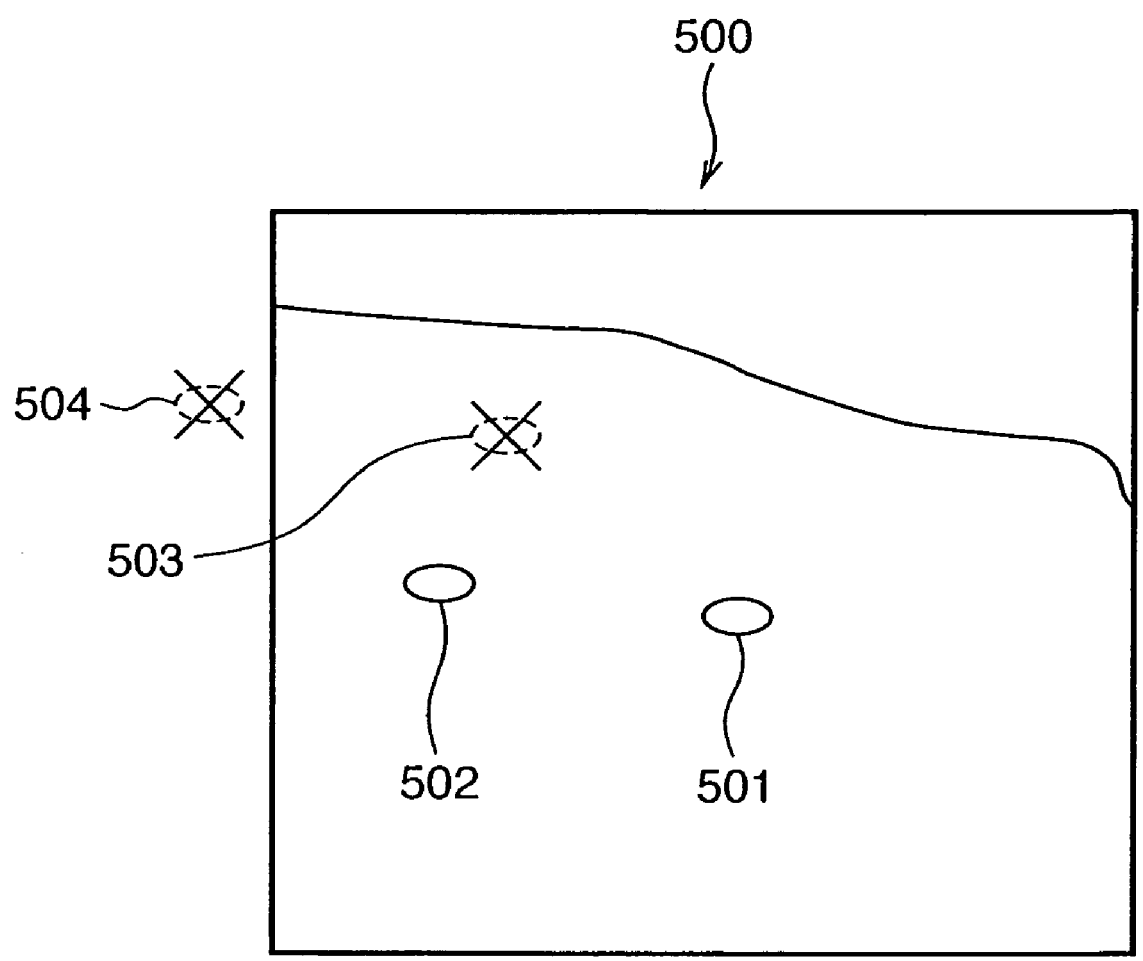
FIG. 5 is an additional view showing a possibility of identification errors of an index in prior art 1, i.e., a state wherein point markers are captured by an image, and they are projected onto the image.

In this embodiment, in step S402 in FIG. 4 that has explained the identification process in the first embodiment, modeling transformation is calculated in the form of a transformation matrix on the basis of the position and orientation measurement values of the object 803 in place of the viewing transformation used to transform the world coordinate system into the camera coordinate system. The modeling transformation is coordinate transformation between two coordinate systems, i.e., a world coordinate system as a coordinate system fixed to the real world, and an object coordinate system as a coordinate system fixed to a target object, and transforms a point on the object coordinate system onto that on the world coordinate system. That is, by calculating this modeling transformation, a position having a coordinate value fixed to an object can be easily transformed into that on the world coordinate system by calculations.

In step S403, the index coordinate projection calculation unit 105 projects indices 203 onto the image sensing plane of the camera 101 using the modeling transformation in place of the viewing transformation. Since other steps in FIG. 4 are processed in the same manner as in the first embodiment, directional square indices can be identified.

Third Embodiment

In the first embodiment, the camera is movable, and indices are fixed. In the second embodiment, the camera is fixed, and the real object having indices is movable. The present invention can also be applied an environment in which both the camera and the real object having indices are movable.

In this case, 3D position and orientation sensors are attached to both the camera and movable real object, and transformation required to calculate projected indices is calculated based on their measurement results in step S402. That is, if a coordinate system fixed to the movable object is an object coordinate system, a coordinate system fixed to the camera is a camera coordinate system, and a coordinate system fixed to the real world is a world coordinate system, transformation required to transform a point on the object coordinate system onto the camera coordinate system (multi-stage transformation) is calculated.

Since this transformation makes modeling transformation that transforms a point on the object coordinate system onto the world coordinate system, and viewing transformation that transforms a point on the world coordinate system onto the camera coordinate system together, it can be easily calculated using the respective transformation matrices.

In step S403, projected indices are calculated using the multi-stage transformation. Other steps can be executed in the same manner as in the first embodiment.

Modification of First to Third Embodiments

In the first to third embodiments described above, the square index shown in FIG. 8 is used as an index. However, any other indices may be used as long as an index has directionality, and that directionality can be detected from an image of the index.

For example, FIGS. 9A to 9E show other examples of indices each of which is formed by a basic shape having no directionality, and a directionality giving shape that gives directionality in combination with the basic shape. Note that a shape "having no directionality" means not only a circle whose outer appearance does not change at all upon rotation about the central point, but also a shape which can have at least two indistinctive rotation states. Therefore, when the basic shape is a square, and is rotated about the central point, 90°, 180°, 270°, and 360° states cannot be distinguished. Hence, the square is handled as a shape having no directionality.

FIG. 9A shows an example of an index in which the basic shape 120 is a regular triangle, and the directionality giving shape 121 is another regular triangle arranged at an offset position in the basic shape. When the index shown in FIG. 9A is used, the projection calculation in step S403 calculates the central point and three vertices, and a triangle detected and its vertices and central point are calculated in step S405. Upon calculating the central point in step S405, an intersection of diagonal lines is calculated in case of a quadrangle. However, in case of a triangle, the central point can be calculated by calculating an intersection of lines from vertices to the middle points of diagonal sides, as shown in FIG. 11A. In FIG. 11B, the directionality giving shape 121 in FIG. 11A is deformed to improve the identifiability of the directionality giving shape 121 when the index size is reduced.

In this manner, as an index in which a directionality giving shape having an image identifiable feature (lightness, saturation, or the like) from the basic shape is set at an offset position in the basic shape, various indices such as an index in which a circular directionality giving shape is set at an offset position in the star-shaped basic shape, and the like can be used. However, when the number of vertices of the basic shape increases, the processing load becomes heavier, and the capacity of the index information data holding unit 104 that stores information associated with indices must be increased. For this reason, it is not preferable that a complicated shape is used as a basic shape.

Furthermore, the directionality giving shape need not be present inside the basic shape. For example, an index may be formed by arranging a rectangle 121 as the directionality giving shape near a square 120 as the basic shape, as shown in FIG. 9B. In this case, a feature (lightness, saturation, or the like) in terms of image identification of the directionality giving shape may be slightly different from or equal to that of the basic shape. As shown in FIG. 9C, an index may be formed by juxtaposing two right-angled triangles (in this case, the basic shape is defined by a combination of two right-angled triangles, and a gap 121 between the triangles serves as the directionality giving shape). As shown in FIG. 9D, an index may be formed by forming a projection 121 as a directionality giving shape on one side of a regular triangle 120 as a basic shape. Furthermore, as shown in FIG. 9E, an index may be formed by the basic shape as a combination of triangles, and a circle as the directionality giving shape. Various other indices are available, but no more exemplification will be omitted.

Fourth Embodiment

In the above embodiments, directionality information is used as geometric information of an index. The fourth to sixth embodiments to be described below are characterized in that area information is used as geometric information of an index.

Figure 12:
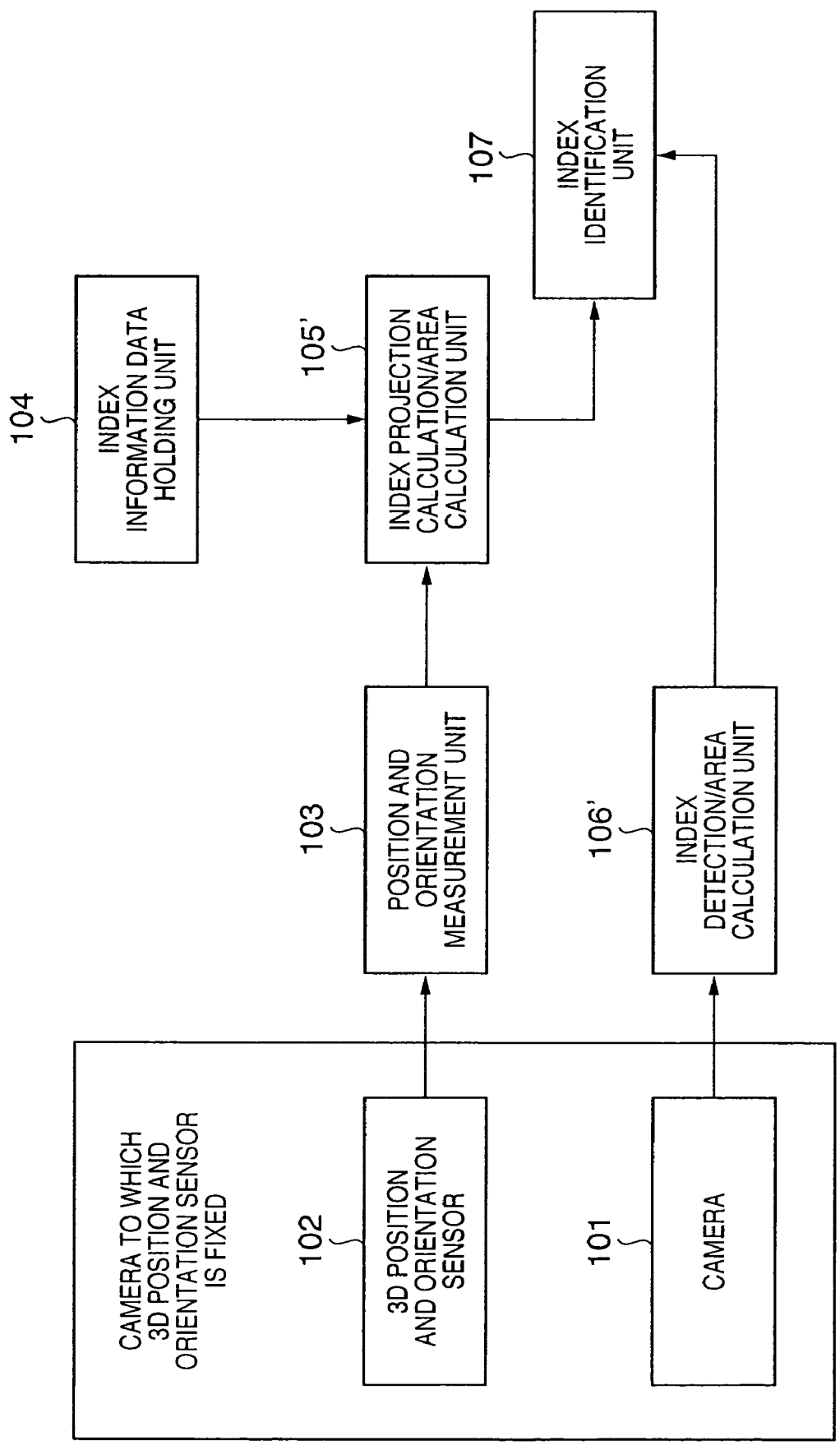
FIG. 12 is a block diagram showing the functional arrangement of an index identification apparatus according to the fourth embodiment of the present invention.
Figure 17A:
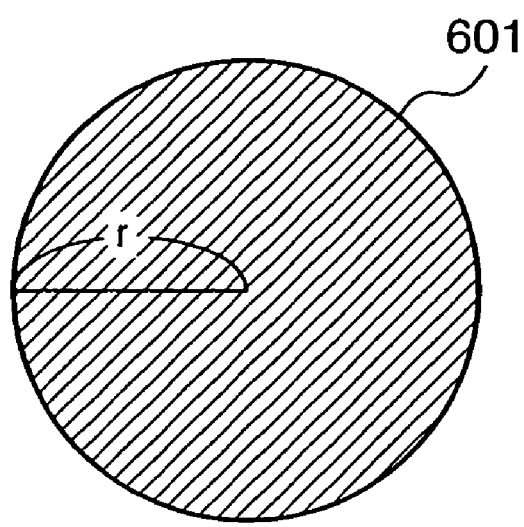
FIGS. 17A and 17B show a circular index used in the fourth embodiment, and the major and minor axes used to calculate the area of that index.

FIG. 12 is a block diagram showing an example of the arrangement of an index identification apparatus according to this embodiment. In this embodiment, a circular index 601 shown in FIG. 17A is used as a preferred index.

The arrangement of the index identification apparatus according to this embodiment is basically common to that described using FIG. 1, except that the index coordinate projection calculation unit 105 is replaced by an index projection calculation/area calculation unit 105', the index detection unit 106 is replaced by an index detection/area calculation unit 106', and an index identification unit 107' executes different processes. Hence, a repetitive description thereof will be omitted.

In this embodiment, the index information data holding unit 104 pre-stores information required to identify an index and its direction such as the layout position (e.g., the 3D absolute coordinate position of the central point), outer shape information (radius, diameter, and the like), and so forth for each of indices arranged on the real space, i.e., each of the circular indices in this embodiment. Note that registration items listed here are merely examples, and information more or fewer than these items may be registered depending on each individual index to be used and an index identification method.

The position and orientation measurement unit 103 supplies position and orientation values of the camera 101 obtained from the 3D position and orientation sensor 102 to the index projection calculation/area calculation unit 105'. The index projection calculation/area calculation unit 105' calculates the projected position and area of an index, which seems to be sensed by the camera 101, on the image plane of the camera 101, on the basis of the position and orientation values of the camera 101, and 3D coordinate information of the circular index recorded in the index information data holding unit 104. An index projected onto the image plane (to be also referred to as an image sensing plane) will be referred to as a projected index hereinafter.

The index detection/area calculation unit 106' captures the sensed image of the camera 101 and detects a region which seems to be an index (to be also referred to a detected index hereinafter) from the image on the basis of information associated with a predetermined index such as a color, shape, and the like. Furthermore, the unit 106' calculates the position (e.g., barycentric position) of the detected index and its area on the image plane. The index identification unit 107' identifies an index from the projected position and area of the index calculated by the index projection calculation/area calculation unit 105' and the detected position and area of the index obtained by the index detection/area calculation unit 106'. Details of an index identification method will be described later.

The process to be executed by the index identification apparatus with the above arrangement will be described below with reference to the flowchart shown in FIG. 15. Note that the same step numbers in FIG. 15 denote steps that execute the same processes as in FIG. 4, and a repetitive description thereof will be avoided.

In step S401, the 3D position and orientation sensor 102 measures the position and orientation, and sends them to the position and orientation measurement unit 103. In step S402, viewing transformation is calculated based on the result obtained in step S401 in the form of a transformation matrix.

In step S1403, the positions (coordinate positions) of the central point and vertices of each individual circular index recorded in the index information data holding unit 104 are transformed into those on the camera coordinate system using the viewing transformation calculated on step S402, and their estimated positions (projected coordinate positions) on the image sensing plane are calculated by making a perspective projection transformation calculation of the camera 101. Note that the perspective projection transformation of the camera 101 is uniquely determined by the lens focal length and principal point (projection center) position of the camera 101, and can be calculated in advance before practicing this embodiment.

Figure 17B:
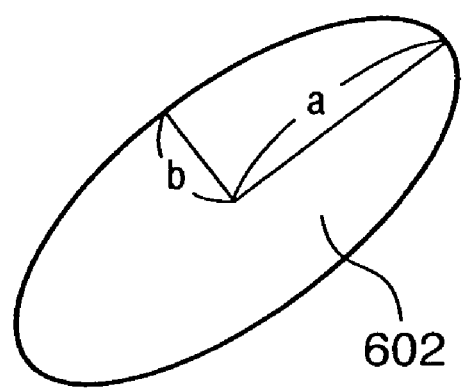

In step S1404, the lengths of the major and minor axes (major axis a and minor axis b shown in FIG. 17B) of an ellipse formed upon projecting the outer shape of the circular index onto the image plane using the viewing transformation as in step S1403 are calculated, thereby calculating the area of the ellipse.

During the processes in steps S401, S402, S1403, and S1404, the camera 101 senses a real space in step S404, and a circular index is detected from the obtained sensed image. The circular index detection method is not particularly limited. For example, in one method, the circular index is set to have a specific color such as red or the like, and is detected as a continuous region by a color detection process. The central position can be calculated as the barycentric position of that continuous region. Furthermore, in this step, pixels which form the periphery of the obtained region are acquired as an peripheral shape.

Next, in step S1407 an ellipse that passes the pixels as the obtained peripheral shape is calculated by approximation, the lengths of the major and minor axes are calculated, and the area on the image plane is calculated. In this step, the number of pixels which form the circular index (the number of pixels that form the peripheral shape and those inside the shape) is counted, and the area may be calculated based on the number of pixels, in place of calculating the area from the ellipse defined by the periphery.

With the aforementioned steps, the projected coordinate position obtained by projecting the central point of each circular index onto the image plane, the area upon projecting the circular index onto the image plane, and the detected coordinate position of the central point and the area on the image plane of the circular index detected from the image (which appears not as a circle but as an ellipse in the image) can be obtained on the basis of the measurement values of the 3D position and orientation sensor.

The final process of this embodiment is identifying which of indices detected from the image a given circular index arranged on the real space corresponds to. In step S1408, a candidate list of indices in the image, which are detected in step S1406 and may correspond to respective projected indices obtained in step S1403, is generated on the basis of the distances between the central points of the projected indices obtained in step S1403, and those of the indices detected in the image in step S1406. This list is a linear list in the order of smaller central point distances. In step S1409, the candidate list which may correspond to the projected indices obtained in step S1403 is searched in turn from the head for an index with a smallest area difference.

Figure 14:
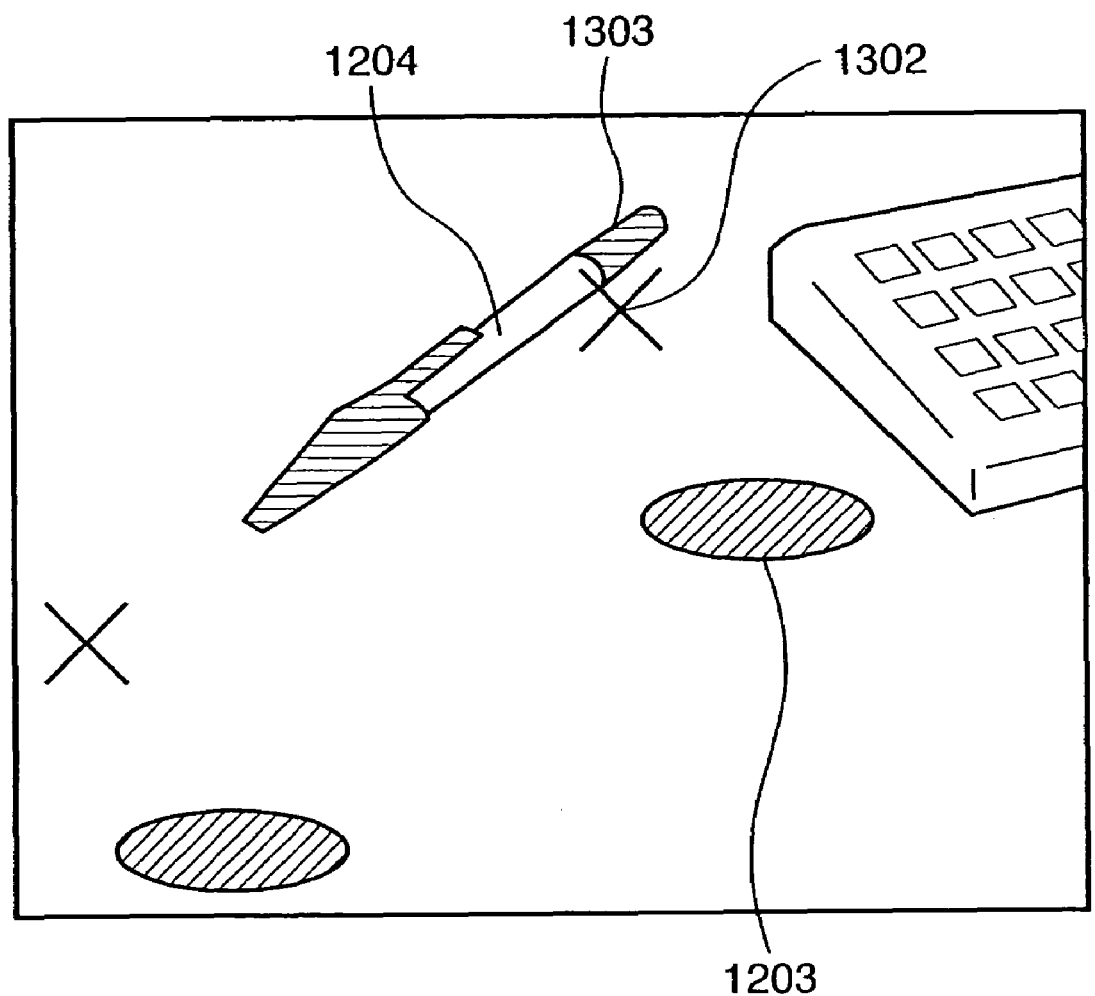
FIG. 14 depicts a state wherein indices are captured by an image, so as to explain the process done in prior art 1.
Figure 16:
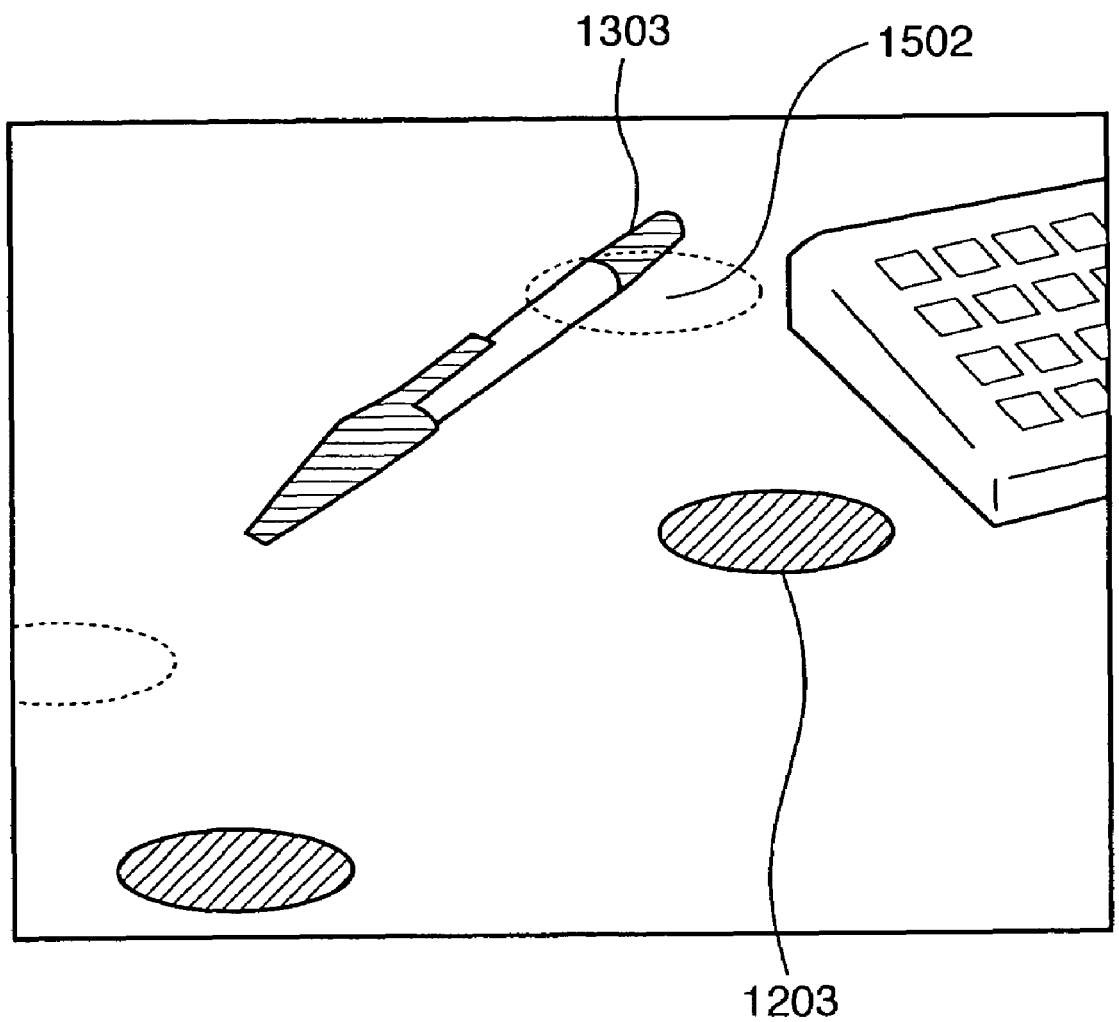
FIG. 16 depicts a state wherein indices are captured by an image, so as to explain the process done in the fourth embodiment.

In this manner, even when an index is to be identified from an image shown in FIG. 14, the area of a red region 1303 of a ballpoint pen 1204 is different from that of each index 1203, thus preventing recognition errors. That is, although the red region 1303 is included in the candidate list, since the area of a projected index 1502 of an index 601 is largely different from that of the region 1303, as shown in FIG. 16, the region 1303 is not identified as a corresponding index. Then, the region 1203 which has the second smallest distance and a small area difference is correctly identified as a corresponding index.

More specifically, the closest detected index which has an area ratio falling within the predetermined range (for example, equal to or larger than 0.5 and equal to or smaller than 2) is identified as a corresponding index. Note that an area difference may be used in place of the area ratio. Since candidates in the candidate list are arranged in the order from the shortest distance, they are checked in turn from the head of the list. When a candidate having an area ratio falling within the predetermined range is found, the process is aborted, and that candidate is identified as a corresponding index. Of course, a candidate which has an area ratio closest to 1 may be selected from all candidates or those which fall within a given distance range. Also, a candidate which satisfies a conditional formula determined based on the distance and area ratio may be selected. That is, an index can be identified by various conditions.

For example, let r be the distance and s be the area ratio. Upon examining t which assumes $t=1/s$ if $s<1$, and $t=s$ if $s \geq 1$, an evaluation value E is given by:

$$E = ar + bt \, (0 < a < 1, \, 0 < b < 1)$$

Then, a candidate which minimizes this E may be selected. Note that a and b in this evaluation formula E are weighting coefficients given in advance. If an importance is attached to the distance, large a and small b are selected; if an importance is attached to the area large b and small a are selected.

In this embodiment, the two processes in steps S1408 and S1409 are a method of listing up detected indices as corresponding candidates with reference to projected indices, and associating indices. However, a method of listing projected indices as corresponding candidates with reference to detected indices may be used. The present invention is not limited to a method of simply generating a candidate list based on distances of indices, but it may adopt various other methods as long as a candidate list is generated by a method based on the coordinate positions of indices on the image plane. Furthermore, in place of the processing sequence that generates a candidate list based on the distances on the image plane, and then associates indices based on the area of each index in that list, indices with similar areas may be listed up, and indices may be associated with each other based on the distance on the image plane from that list.

As described above, according to this embodiment, an index is identified using not only the distance between the projected and detected indices on the image plane but also information associated with the area as geometric information of the index. Hence, if a region having a color similar to that of an index is present on the real space, and is detected as an index, the index can be normally identified. Therefore, indices with a single color may be used. As a result, the index can have a size smaller than those of indices used in prior art 2 or indices formed by arranging different colors in a concentric pattern, and can also have a relatively inconspicuous outer appearance. Furthermore, since an index need not be captured to have a large size in the image, the restrictions on the camera and index positions can be very relaxed.

Fifth Embodiment

In the fourth embodiment, the 3D position and orientation sensor is fixed to the camera, and the camera which dynamically moves senses indices fixed to the real space. However, the present invention can be preferably applied to a case wherein the camera is fixed in position, and a real object on which the 3D position and orientation sensor and indices are laid out moves.

Figure 18:
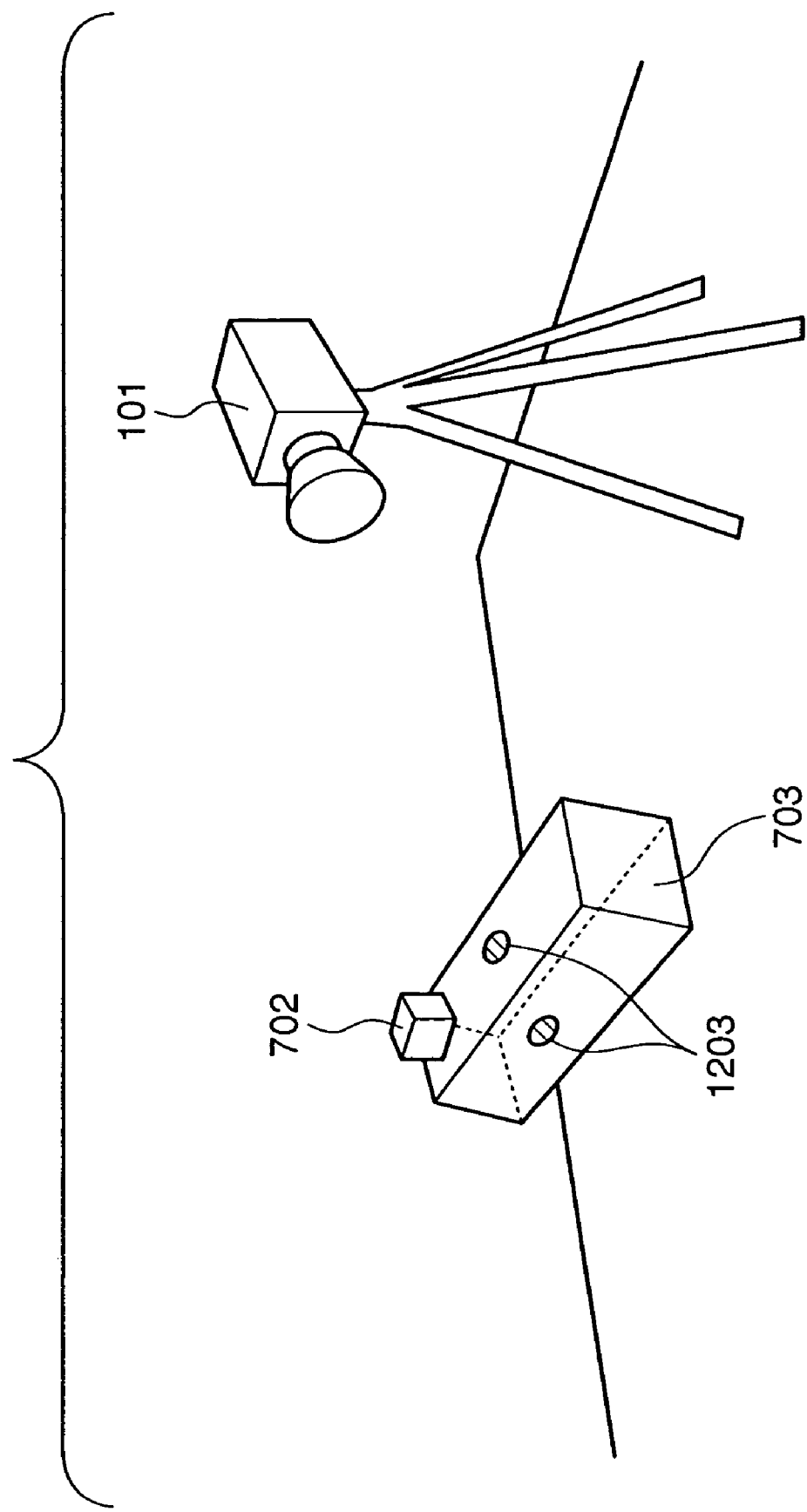
FIG. 18 depicts a use scene of the fifth embodiment.

FIG. 18 depicts the relationship among a camera 101, real object 703, and 3D position and orientation sensor 702. Note that the index identification apparatus shown in FIG. 12 can be used without modifying its arrangement, except that the attached position of the 3D position and orientation sensor 8702 is changed from the camera 101 to the real object 703.

Figure 15:
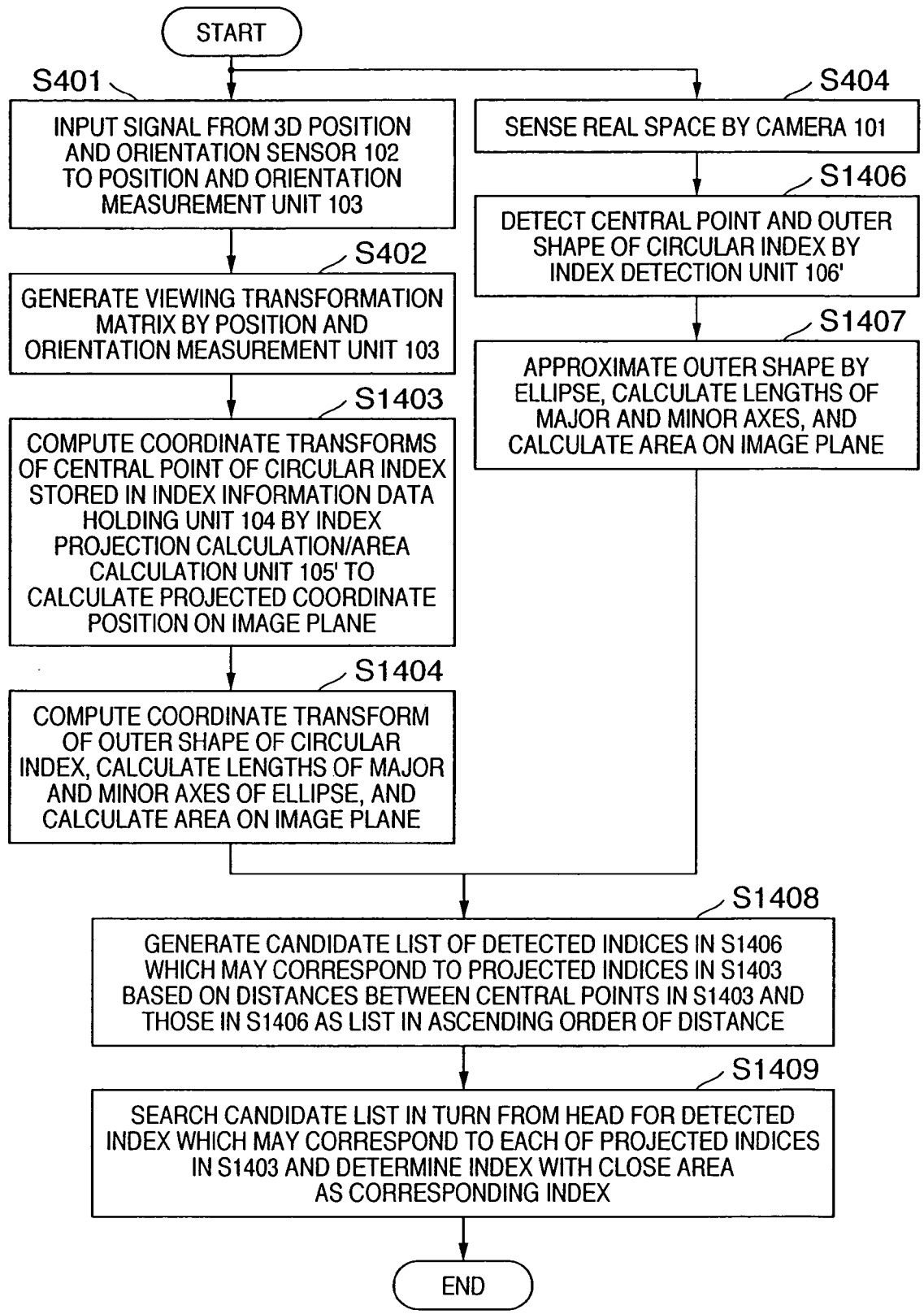
FIG. 15 is a flowchart of the process to be executed by the index identification apparatus according to the fourth embodiment of the present invention.

In this embodiment, in step S402 in FIG. 15 that has explained the identification process in the fourth embodiment, modeling transformation is calculated in the form of a transformation matrix on the basis of the position and orientation measurement values of the object 703 in place of the viewing transformation used to transform the world coordinate system into the camera coordinate system. The modeling transformation is coordinate transformation between two coordinate systems, i.e., a world coordinate system as a coordinate system fixed to the real world, and an object coordinate system as a coordinate system fixed to a target object, and transforms a point on the object coordinate system onto that on the world coordinate system. That is, by calculating this modeling transformation, a position having a coordinate value fixed to an object can be easily transformed into that on the world coordinate system by calculations.

The index coordinate projection calculation/area calculation unit 105' projects indices 1203 onto the image sensing plane of the camera 101 using the modeling transformation in step S1403 in place of the viewing transformation, and calculates the areas of ellipses formed by the projected indices on the image plane in step S1404. Since other steps in FIG. 15 are processed in the same manner as in the fourth embodiment, circular indices can be identified.

Sixth Embodiment

In the fourth embodiment, the camera is movable, and indices are fixed. In the fifth embodiment, the camera is fixed, and the real object having indices is movable. The present invention can also be applied an environment in which the camera is further movable in the fifth embodiment, i.e., both the camera and the real object having indices are movable.

In this case, 3D position and orientation sensors are attached to both the camera 101 and movable real object 703, and transformation required to calculate projected indices is calculated based on their measurement results in step S402. That is, if a coordinate system fixed to the movable object is an object coordinate system, a coordinate system fixed to the camera is a camera coordinate system, and a coordinate system fixed to the real world is a world coordinate system, transformation required to transform a point on the object coordinate system onto the camera coordinate system (multi-stage transformation) is calculated.

Since this transformation makes modeling transformation that transforms a point on the object coordinate system onto the world coordinate system, and viewing transformation that transforms a point on the world coordinate system onto the camera coordinate system together, it can be easily calculated using the respective transformation matrices.

In step S1403, projected indices are calculated using the multi-stage transformation. Other steps can be executed in the same manner as in the fourth embodiment.

Modification of Fourth to Sixth Embodiments

In the fourth to sixth embodiments described above, the areas of the projected index and detected index are calculated, and are compared. Alternatively, another information corresponding to the area such as the number of pixels in the image or the like may be compared.

In the fourth to sixth embodiments, the circular index shown in FIG. 17A is used as an index. However, an index may have other shapes as long as they have a spread as a figure, and allow to calculate the area. For example, a polygonal index and, more particularly, a square index shown in FIG. 19A, may be used.

Figure 21:
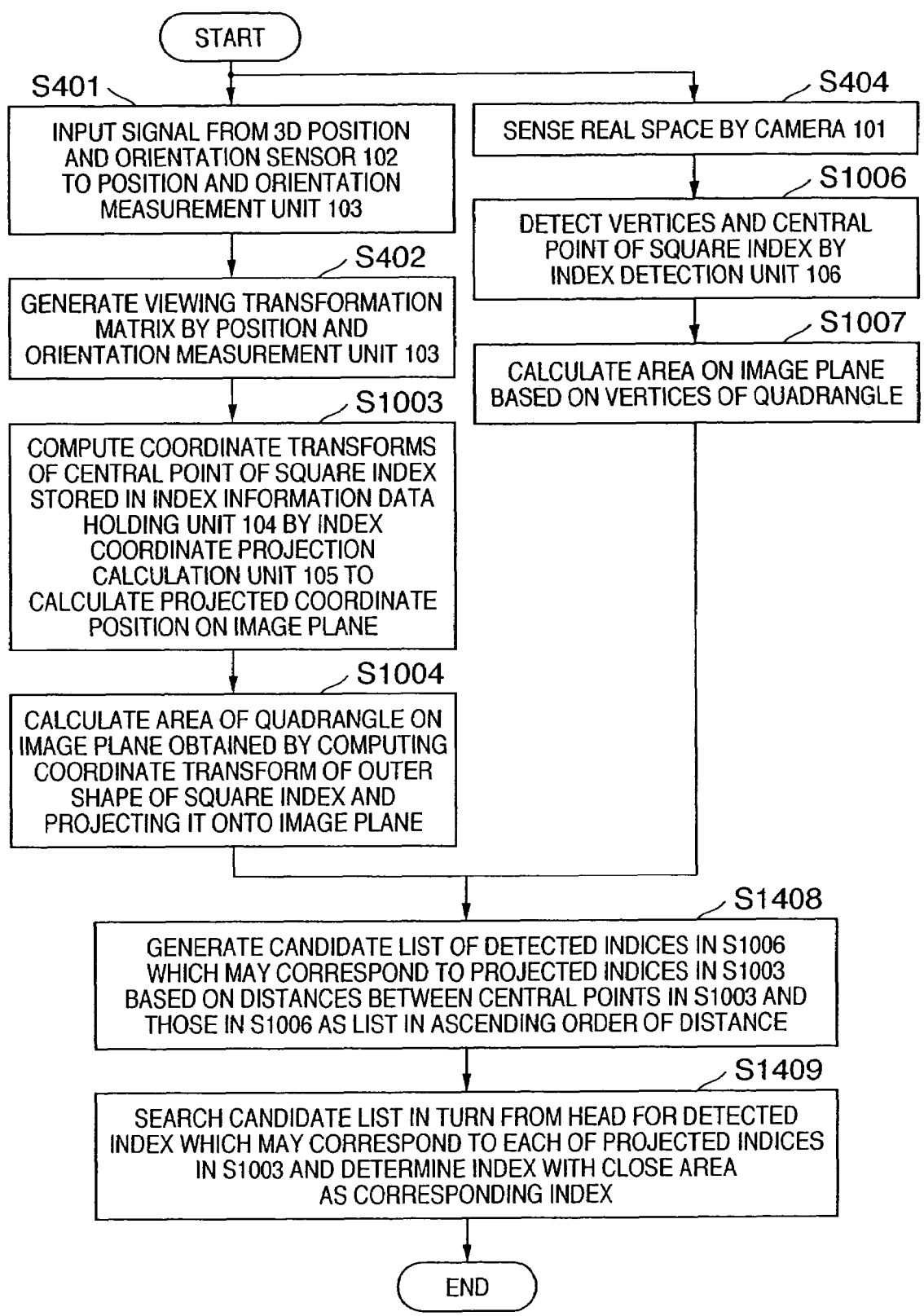
FIG. 21 is a flowchart of the process to be executed by the index identification apparatus according to a modification of the fourth to sixth embodiments of the present invention.

An embodiment using such square index will be described in detail below using the flowchart of FIG. 21. Note that the same step numbers in FIG. 21 denote the steps that execute the same processes as those in FIG. 15, and a repetitive description thereof will be omitted.

In step S1003, a 3D coordinate position of the central point of each square index recorded in the index information data holding unit 104 into that on the camera coordinate system using viewing transformation calculated in step S402, and its estimated position (projected coordinate position) on the image sensing plane is calculated by making a perspective projection transformation calculation of the camera 101. Note that the perspective projection transformation of the camera 101 is uniquely determined by the lens focal length and principal point (projection center) position of the camera 101, and can be calculated in advance before practicing this embodiment.

In step S1004, the area of the projected index is calculated by calculating vertices (P0, P1, P2, and P3 shown in FIG. 19B) of a quadrangle formed when the outer shape of the square index is projected onto the image plane using the viewing transformation and the outer shape information (e.g., 3D coordinate positions of respective vertices) of the square index recorded in the index information data holding unit 104. This calculation is practiced by dividing a quadrangle formed upon projecting the square index onto the image plane into two triangles (P0-P3-P2 and P1-P2-P3), as shown in FIG. 19C, and calculating the areas of these triangles. More specifically, the area of one triangle is calculated based on a length c of a perpendicular dropped from the vertex P3 to the side P0-P1, and a length a of the side P0-P1, the area of the other triangle is calculated based on a length d of a perpendicular dropped from the vertex P1 to the side P2-P3, and a length b of the side P2-P3. The calculation formulas for the aforementioned square index can be similarly applied to a case wherein the index is a rectangle. Furthermore, the areas of quadrangles can be calculated by a similar method. That is, an index having a square shape has been exemplified, but this method is not limited to the square but may be applied to any other shapes as long as they are quadrangles. Furthermore, since every polygons such as a triangle, pentagon, and the like can be divided into triangles, their areas can be calculated by a similar method. In such case, only a method of dividing each polygon into triangles is different.

During the processes in steps S401, S402, S1003, and S1004, the camera 101 senses a real space in step S404, and a square index is detected from the obtained sensed image in step S1006. The square index detection method is not particularly limited. For example, the following method may be used.

The lightness value of an index is set to be different from that of the background, and binarization is made based on the lightness value. After that, a continuous region is obtained by a labeling process. By approximating the periphery of the label of that continuous region by a polygonal line, an outer rectangle (outer shape) is detected. The vertices of the obtained quadrangle are calculated, and the central point is obtained by calculating the intersection of diagonal lines. Next, in step S1007 the area on the image plane is calculated from the vertices of the quadrangle. In this step, in place of calculating the area based on the vertices, the number of pixels that form the square index may be counted, and the area may be calculated based on the number of pixels. Note that the method of approximating the periphery of a continuous region by a polygonal line, and obtaining the vertices and sides of a polygon based on that polygonal line can be applied to polygons, the area of a polygon can be calculated by a similar method.

In step S1408, a candidate list of detected indices in the image, which may correspond to respective projected indices obtained in step S1003, is generated on the basis of the distances between the projected coordinate positions of the central points of the squares obtained in step S1003, and the detected coordinate positions of the central points of the squares obtained in step S1006. This list is a linear list in the order of smaller distances. In step S1409, the candidate list which may correspond to the projected indices obtained in step S1003 is searched in turn from the head for an index which has, e.g., an area ratio falling within the predetermined range and shortest distance.

Figure 13:
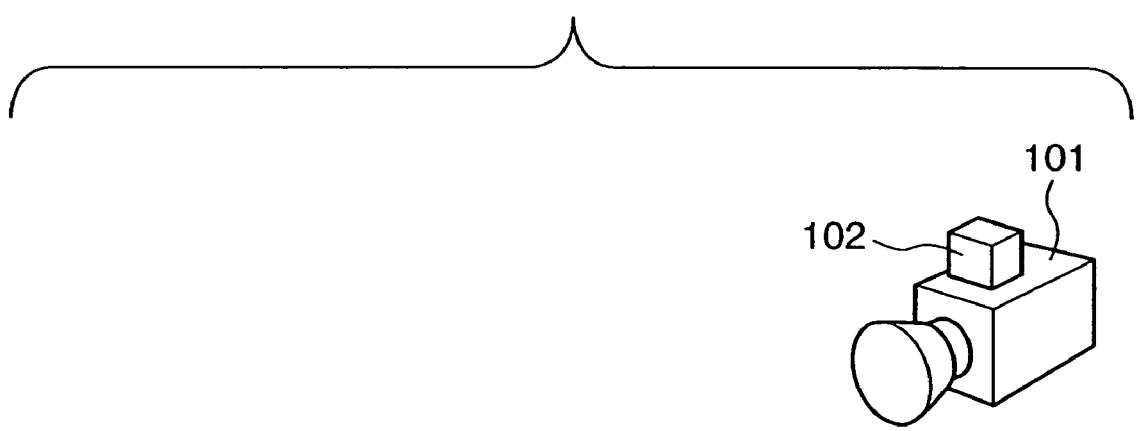
FIG. 13 depicts a use scene of prior art 1 and the fourth embodiment of the present invention.
Figure 13:
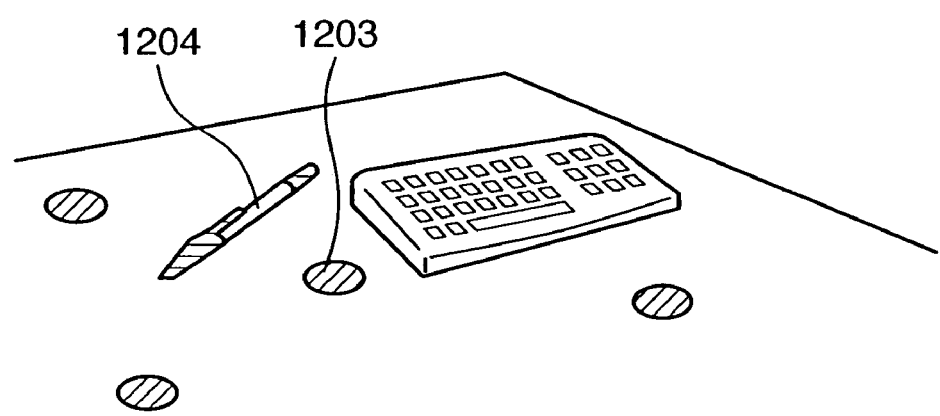

FIG. 20 shows an image obtained by sensing a space in which a square index 901 replaces the circular index 203 by the camera 101 in the environment shown in FIG. 13. This space undergoes the processes in FIG. 21, and a square index projected onto the image plane in the processes in steps S401 to S1004 is 902. In this image, a keyboard 903 appears as an object which is originally present in the real space except for an index, and its key tops are detected as quadrangles. In such case, with the method of prior art 1 which does not consider any index area, a key top region closest to the projected index 902 is erroneously identified as a corresponding detected index in place of the detected index 901 to be associated. However, even in such case, in this embodiment, the projected index 902 is correctly associated with the detected index 901 without being associated with any key top region, due to the difference between the areas of the key top region and projected index 902.

Another Embodiment

In the aforementioned embodiments, the index detection apparatus including the camera and 3D position and orientation sensor has been explained for the sake of easy understanding. However, these components are not always required. That is, the 3D position and orientation measurement of the camera (first/third/fourth/sixth embodiment) or real object (second/third/fifth/sixth embodiment) and image sensing may be done by another device, and the 3D position measurement results and sensed image may be acquired from the other device. In addition to the real-time process, an identification process may be executed using the 3D position measurement results and sensed images, which are recorded.

In the aforementioned embodiments, information associated with directionality and information associated with an area are used as geometric information of an index. However, various other kinds of geometric information may be used. As such geometric information, the circularity, ellipticity, moment, horizontal to vertical ratio (aspect ratio) and the like of the index may be used. For example, horizontal to vertical ratio may be used for rectangle indices, and ellipticity and moment feature may be used for ellipse indices Functions equivalent to those of the index identification apparatus explained in the above embodiments may be implemented by a system including a plurality of devices.

Note that the present invention includes a case wherein the equivalent functions are achieved by supplying a software program that implements the functions of the aforementioned embodiments directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, a user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the present invention, even when a plurality of indices cannot be identified by merely detecting them from an image, they can be individually identified using geometric information of each index.

Since an index having directionality as geometric information does not require neither extra figure nor pattern as additional information for individual identification, it is simple, and is easily and stably detected from an image. That is, not only when an index is captured by an image to have a sufficiently large size but also when it is captured to have a small size, the index can be stably detected. The index to be used can have a smaller size than those used in prior art 2, and can also have a relatively inconspicuous outer appearance.

When the area is used as geometric information, even when a region of a color similar to that of an index is present on the real space and is erroneously detected as an index, an index can be correctly identified.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Applications No. 2003-341621 and No. 2003-341623, both filed on Sep. 30, 2003, which are hereby incorporated by reference herein.

What is claimed is:

1. An index identification method for detecting and identifying an index from an acquired image using position information and geometric information of the index, which are held in advance, the method comprising:

using a computer to perform the steps of:

an image acquisition step of acquiring an image obtained by sensing a real space including an index having a predetermined shape by an image sensing device;

a position and orientation information acquisition step of acquiring measurement results of a three-dimensional position and orientation of at least one of the image sensing device and the real object;

a detection step of detecting the index from the acquired image and obtaining position information and geometric information of the detected index;

an estimation step of calculating estimated position and geometric information of the index on an image sensing plane of the image sensing device on the basis of the three-dimensional position and orientation measurement results and the position information and geometric information of the index held in advance; and an index identification step of identifying the detected index by comparing the obtained position information and geometric information of the detected index with the estimated position and geometric information of the index, wherein the geometric information of the index held in advance indicates a directionality of the index in a plane where the index is arranged.

2. The method according to claim 1, wherein, the index identification step includes a step of identifying correspondence between an index detected in the image and the index on the basis of a position of the index in the image, the estimated position of the index calculated in the estimated position calculation step, and the information indicating the directionality of the index.

3. The method according to claim 2, wherein the index identification step includes a step of identifying on the basis of directionality of the index detected in the image, and information associated with directionality, which is recorded in association with an index having the estimated position close to the index in advance.

4. The method according to claim 2, wherein the index is formed by a basic shape having no directionality, and a directionality giving shape that gives directionality to the basic shape, and a direction of the index is recognized using a positional relationship between the basic shape and the directionality giving shape of the index identified in the image in the index identification step.

5. The method according to claim 2, wherein the index identification step includes:

a step of calculating a barycentric position of an image of the index in the image;

a step of determining a plurality of representative point positions of the index using the barycentric position; and a determination step of determining a direction of the index using image information of the barycentric positions and image information of the plurality of representative point positions.

6. The method according to claim 2, wherein the information indicating directionality of the index is three-dimensional position information of a specific vertex of the index.

7. The method according to claim 1, wherein the index is characterized by having an outer appearance formed by a combination of a basic shape having no directionality, and one directionality giving shape that gives directionality to the basic shape.

8. The method according to claim 7, wherein the directionality giving shape has a feature in terms of image identification different from the basic shape, and is formed at an offset position inside the basic shape.

9. The method according to claim 7, wherein the directionality giving shape is set to contact or to be separated from the basic shape.

10. The method according to claim 1, wherein, said geometric information is information associated with an area of the index, the index identification step includes a projected index calculation step of calculating information associated with a position and area of a projected index formed by projecting the index onto an image sensing plane of the image sensing device on the basis of the three-dimensional position and orientation measurement result of at least one of the image sensing device and the real object acquired in the position and orientation information acquisition step, and information associated with a position and area of the index, and the index identification step includes a step of identifying correspondence between an index detected in the image and the index on the basis of the information associated with the position and area of the index detected in the image and the information associated with the position and area of the projected index.

11. The method according to claim 10, wherein the index identification step includes a step of identifying a region which has a small distance and a small area difference from the projected index of those detected in the image as an index corresponding to the projected index.

12. The method according to claim 10, wherein the region detection step includes a step of detecting a continuous region having a specific color or a lightness difference from a surrounding portion as the index.

13. The method according to claim 10, wherein the information associated with the index is information associated with a three-dimensional coordinate position of a central point of the index and an outer shape of the index.

14. The method according to claim 13, wherein the index has a circular shape, and the information associated with the outer shape indicates a radius or diameter.

15. The method according to claim 13, wherein the index has a regular polygonal shape, and the information associated with the outer shape is information indicating three-dimensional coordinate positions of vertices.

16. A computer-executable program stored on a computer-readable recording medium for making a computer execute an index identification method of claim 1.

17. An index identification apparatus for detecting and identifying an index from an acquired image using position information and geometric information of the index, which are held in advance, comprising:
- image acquisition unit adapted to acquire an image obtained by sensing a real space including an index having a predetermined shape by an image sensing device;
- position and orientation information acquisition unit adapted to acquire measurement results of a three-dimensional position and orientation of at least one of the image sensing device and the real object;
- a detection unit adapted to detect the index from the acquired image and obtaining position information and geometric information of the detected index;
- an estimation unit adapted to calculate estimated position and geometric information of the index on an image sensing plane of the image sensing device on the basis of the three-dimensional position and orientation measurement results and the position information and geometric information of the index held in advance; and
- index identification unit adapted to identify the detected index by comparing the obtained position information and geometric information of the detected index with the estimated position and geometric information of the index,
- wherein the geometric information of the index held in advance indicates a directionality of the index in a plane where the index is arranged.

18. The apparatus according to claim 17, further comprising:
- the image sensing device; and
- three-dimensional position and orientation measurement unit adapted to measure a three-dimensional position and orientation of at least one of the image sensing device and the real object.

* * * * *